US010077955B2

(12) United States Patent
Morrison

(10) Patent No.: US 10,077,955 B2
(45) Date of Patent: Sep. 18, 2018

(54) SUPERCONDUCTING ELECTRICAL MACHINE WITH DOUBLE RE-ENTRANT ENDS FOR MINIMIZING HEAT LEAK

(71) Applicant: KATO ENGINEERING INC., North Mankato, MN (US)

(72) Inventor: Darrell Morrison, Eagle Lake, MN (US)

(73) Assignee: KATO ENGINEERING INC., North Mankato, MN (US)

( * ) Notice: Subject to any disclaimer, the term of this patent is extended or adjusted under 35 U.S.C. 154(b) by 516 days.

(21) Appl. No.: 14/662,064

(22) Filed: Mar. 18, 2015

(65) Prior Publication Data

US 2016/0276918 A1    Sep. 22, 2016

(51) Int. Cl.
*H02K 55/00* (2006.01)
*F28F 13/00* (2006.01)
*H02K 9/22* (2006.01)
*H02K 55/04* (2006.01)

(52) U.S. Cl.
CPC ............ *F28F 13/00* (2013.01); *H02K 55/04* (2013.01); *F28F 2013/001* (2013.01); *Y02E 40/625* (2013.01)

(58) Field of Classification Search
CPC .... F28F 13/00; F28F 2013/001; H02K 55/00; H02K 55/04; H02K 9/22; Y02E 40/625
USPC ........................................................ 310/113
See application file for complete search history.

(56) References Cited

U.S. PATENT DOCUMENTS

| 4,385,248 | A | * | 5/1983 | Laskaris | ................. H02K 3/46 29/596 |
| 7,466,045 | B2 | | 12/2008 | Andres | |
| 7,548,000 | B2 | * | 6/2009 | Urbahn | .................... H02K 9/20 310/54 |
| 7,638,908 | B2 | | 12/2009 | Winn | |
| 7,791,229 | B2 | | 9/2010 | Goodzeit | |
| 7,843,094 | B2 | * | 11/2010 | Goodzeit | ............... H02K 55/02 310/112 |
| 7,956,503 | B2 | * | 6/2011 | Goodzeit | ............... H02K 55/02 310/112 |
| 8,084,909 | B2 | | 12/2011 | Goodzeit et al. | |

(Continued)

FOREIGN PATENT DOCUMENTS

| CA | 2796184 A1 * | 6/2013 | ............. H02K 55/00 |
| GB | 2484421 B * | 7/2012 | ............. H02K 55/00 |

*Primary Examiner* — Alex W Mok
(74) *Attorney, Agent, or Firm* — Foley & Lardner LLP

(57) ABSTRACT

A superconducting electrical machine includes at least one re-entrant end including at least two segments. The at least two segments are continuous. At least one re-entrant end may be included in a stator of the superconducting electrical machine, the stator being disposed substantially coannular with a longitudinal axis. At least one re-entrant end may also be included in a rotor of the superconducting electrical machine, the rotor being configured to rotate about a longitudinal axis. A first segment is substantially perpendicular to a plane parallel to the longitudinal axis, and a second segment is coannular with the longitudinal axis. Heat distal from rotor windings and/or stator windings encounters a thermal resistance provided by the at least two segments as the heat travels towards the rotor windings and/or stator windings.

13 Claims, 15 Drawing Sheets

(56) References Cited

U.S. PATENT DOCUMENTS

| | | | |
|---|---|---|---|
| 2009/0186769 A1* | 7/2009 | Bray | H01F 6/06 |
| | | | 505/230 |
| 2009/0251014 A1 | 10/2009 | Goodzeit | |
| 2010/0259117 A1* | 10/2010 | Goodzeit | H02K 55/00 |
| | | | 310/52 |
| 2011/0025146 A1* | 2/2011 | Goodzeit | H02K 55/00 |
| | | | 310/61 |
| 2011/0148238 A1* | 6/2011 | Goodzeit | H02K 55/00 |
| | | | 310/126 |
| 2012/0248903 A1* | 10/2012 | Cullen | H02K 55/04 |
| | | | 310/53 |
| 2013/0187491 A1* | 7/2013 | Frank | H02K 55/04 |
| | | | 310/54 |
| 2014/0310897 A1* | 10/2014 | Higgins | B24D 13/045 |
| | | | 15/97.3 |

* cited by examiner

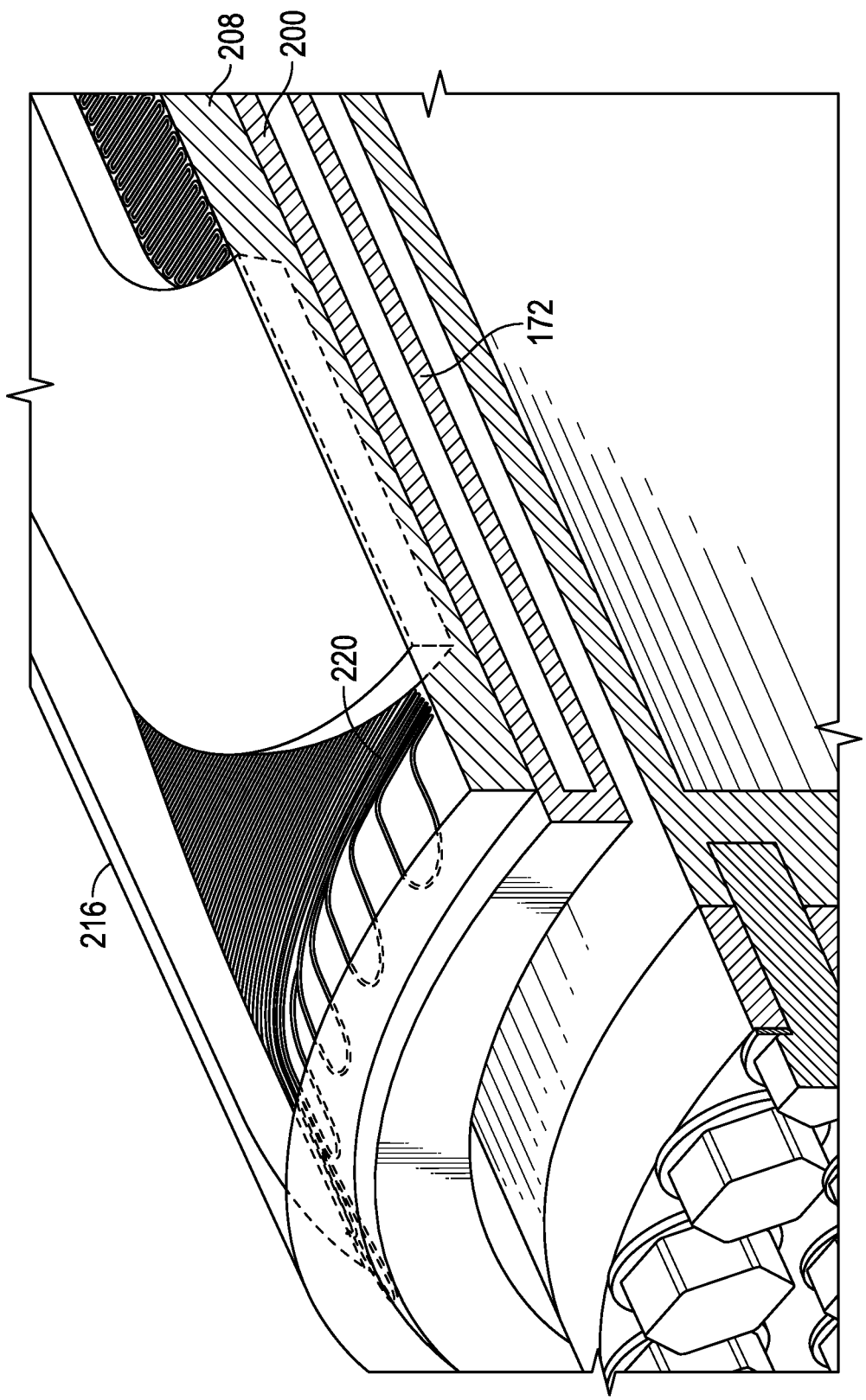

SUPERCONDUCTING ELECTRICAL MACHINE WITH DOUBLE RE-ENTRANT ENDS FOR MINIMIZING HEAT LEAK

FEDERAL FUNDING STATEMENT

The present disclosure was made with government support under Contract No. DE-EE0005140 awarded by the U.S. Department of Energy. The U.S. Government has certain rights in the present disclosure.

BACKGROUND

The present invention relates generally to the field of electrical machines for energy conversion, such as motors and generators. Motors convert electricity into mechanical energy. Generators generate electricity by converting mechanical energy into electrical energy. A prime mover, such as an engine driving a rotating shaft, provides the mechanical energy. A rotor having permanent magnets or electromagnets rotates with the rotating shaft, generating a magnetic field that causes electricity to be generated in a stationary stator.

Superconducting electrical machines, such as a superconducting generator, use the principle of superconductivity to significantly reduce the electrical resistance in the conductors of the generator. Superconductivity requires maintaining the conductors at very low temperatures. However, such low temperatures relative to temperatures in an environment outside the superconducting electrical machine, such as a room temperature, lead to a large driving force for heat transfer into the superconducting electrical machine. Typically, complex and expensive sealing and vacuum pumping systems are necessary to maintain the conductors at very low temperatures. Expensive machines called cryocoolers are used to obtain superconducting coolant temperatures needed for superconductivity. Generally, one Watt of cooling load at superconducting temperatures may require about 100 Watts of power at room temperature.

SUMMARY

One embodiment of the invention relates to a superconducting electrical machine. The superconducting electrical machine includes a rotor configured to rotate about a longitudinal axis. The rotor includes a drive end, a non-drive end, and at least one re-entrant end disposed proximate to at least one of the drive end and the non-drive end. The at least one re-entrant end includes at least two rotor segments. The rotor segments are continuous, a first rotor segment is substantially perpendicular to a plane parallel to the longitudinal axis, and a second rotor segment is coannular with the longitudinal axis. Heat distal from the rotor winding encounters thermal resistance provided by the at least one re-entrant end as the heat travels towards the rotor winding.

Another embodiment relates to a superconducting electrical machine. The superconducting electrical machine includes a stator disposed substantially coannular with a longitudinal axis. The stator includes a drive end, a non-drive end, and at least one re-entrant end disposed proximate to at least one of the drive end and the non-drive end. The at least one re-entrant end includes at least two stator segments. The stator segments are continuous, a first stator segment is substantially perpendicular to a plane parallel to the longitudinal axis, and a second stator segment is coannular with the longitudinal axis. Heat distal from the stator winding encounters thermal resistance provided by the at least one re-entrant end as the heat travels towards the stator winding.

Another embodiment relates to a system for reducing a rate of heat transfer in a superconducting electrical machine. The system includes a continuous pathway for heat transfer from a heat source to a heat sink. The system also includes a sidewall disposed along the pathway. The sidewall includes a plurality of sidewall segments. Each of the sidewall segments is continuous with at least one adjacent sidewall segment. The plurality of sidewall segments increases a resistance to heat transfer from the heat source to the heat sink.

Alternative embodiments relate to other features and combinations of features as may be generally recited in the claims.

BRIEF DESCRIPTION OF THE DRAWINGS

The invention will become more fully understood from the following detailed description, taken in conjunction with the accompanying figures, in which like reference numerals refer to like elements.

FIG. 15 is a cutaway view of the active sections of a rotor of a superconducting electrical machine in accordance with one embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, superconducting electrical machines include a stator supported in a stator frame and a rotor configured to rotate in a cavity defined by the stator. The rotor and stator are each surrounded by a cryostat to maintain a vacuum at superconducting temperatures around the rotor and the stator. A cryocooler provides coolants to the rotor and the stator to maintain the rotor active section and the stator active section at superconducting temperatures. The rotor may be rotated using mechanical energy from a prime mover (e.g. engine, gas turbine, wind turbine, etc.). The rotor and stator each include active sections with windings configured to superconduct when a temperature of the winding is no greater than a superconducting temperature. Active sections include regions in the superconducting electrical machine in which superconducting processes occur, and/or regions which are involved in the electromagnetic behavior of the superconducting electrical machine. The rotor and stator may each include a re-entrant drive end disposed proximate to a drive end of the superconducting electrical machine. The rotor and stator may each include a re-entrant non-drive end disposed proximate to a non-drive end of the superconducting electrical machine. The re-entrant ends may include segments that create an extended pathway for conduction of heat. Heat at the drive end or the non-drive end encounters thermal resistance due to a re-entrant end as the heat travels towards the interior of the rotor and/or the stator, such as towards a rotor winding and/or a stator winding. A re-entrant end provides radial and axial flexibility to accommodate various forces and stresses that may occur within a superconducting electrical machine.

Figure 1:
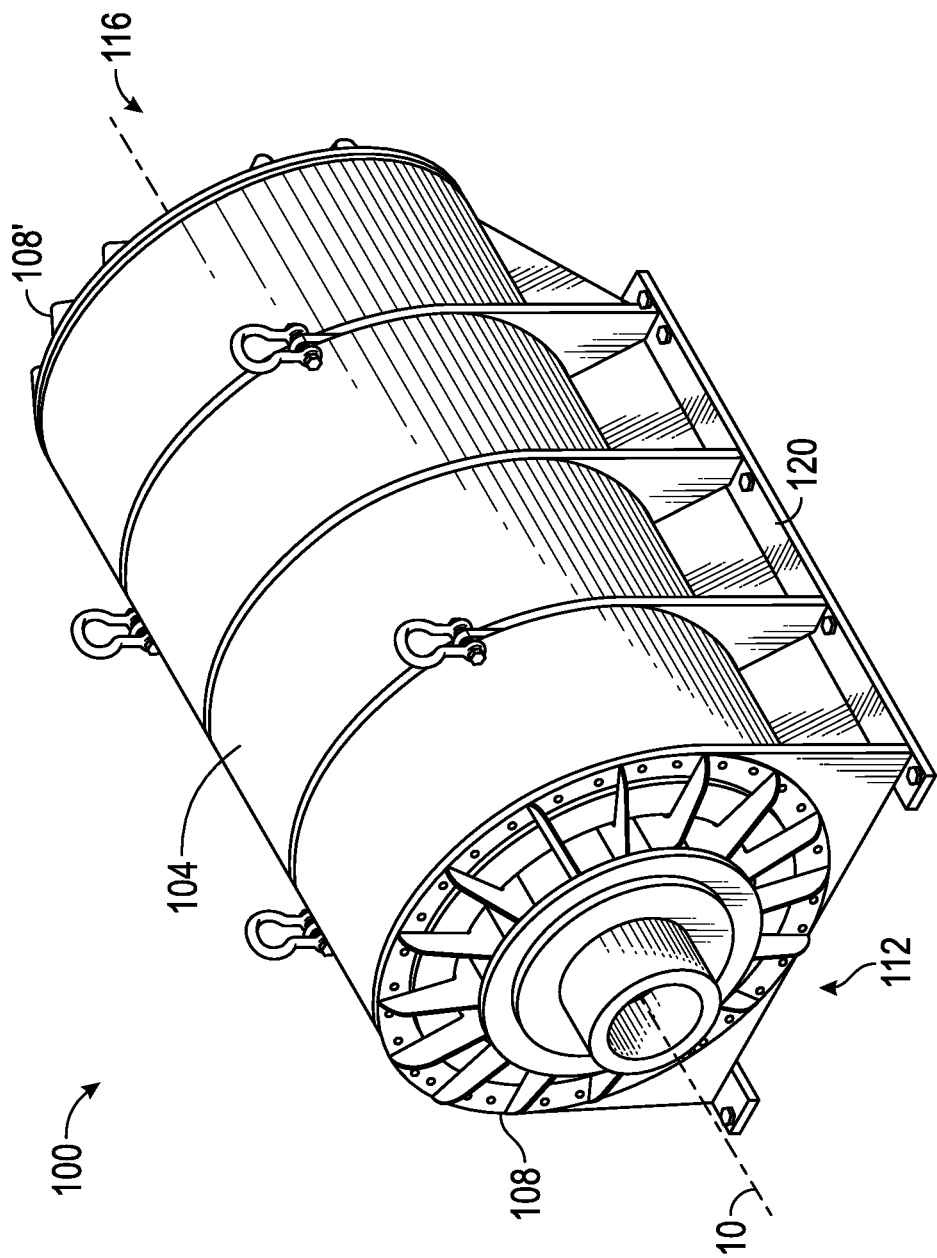
FIG. 1 is a perspective view of a superconducting electrical machine, in accordance with one embodiment.

Referring to FIG. 1, in some embodiments, superconducting electrical machine 100 includes a stator frame 104. Stator frame 104 may be a housing that supports a stator (e.g., stator 160 shown in FIG. 7). In some embodiments, the stator frame 104 includes a shape that is substantially a cylindrical shell. The superconducting electrical machine 100 may also include a base 120 attached to the stator frame 104 to support the weight of the superconducting electrical machine 100.

A superconducting electrical machine 100 may include a pair of bracket assemblies 108, 108' disposed at a drive end 112 and a non-drive end 116 of the superconducting electrical machine 100. The pair of bracket assemblies 108, 108' may include a pair of bearings to support a rotor and accommodate rotation of the rotor about a longitudinal axis 10 (see, e.g., bearings 180, 180' shown in FIG. 9, rotor 150 shown in FIGS. 5-7). A longitudinal axis 10 may pass through the superconducting electrical machine 100 and perpendicular to a pair of planes substantially defined by the pair of bracket assembles 108, 108'.

A drive end 112 is an end region of a superconducting electrical machine 100 proximate to a prime mover, such as a wind turbine, and at which a shaft may be received from the prime mover. A non-drive end 116 is an end region of the superconducting electrical machine 100 located on an opposite end of the superconducting electrical machine 100 from the drive end 112. Similarly, a drive end 112 region of a rotor or a stator is a region of the rotor or stator proximate to the drive end 112 of the superconducting electrical machine 100, and a non-drive end 116 region of a rotor or a stator is a region of the rotor or stator located on an opposite end of the rotor or the stator from the drive end (see, e.g., rotor 150, stator 160 shown in FIG. 7).

Figure 2:
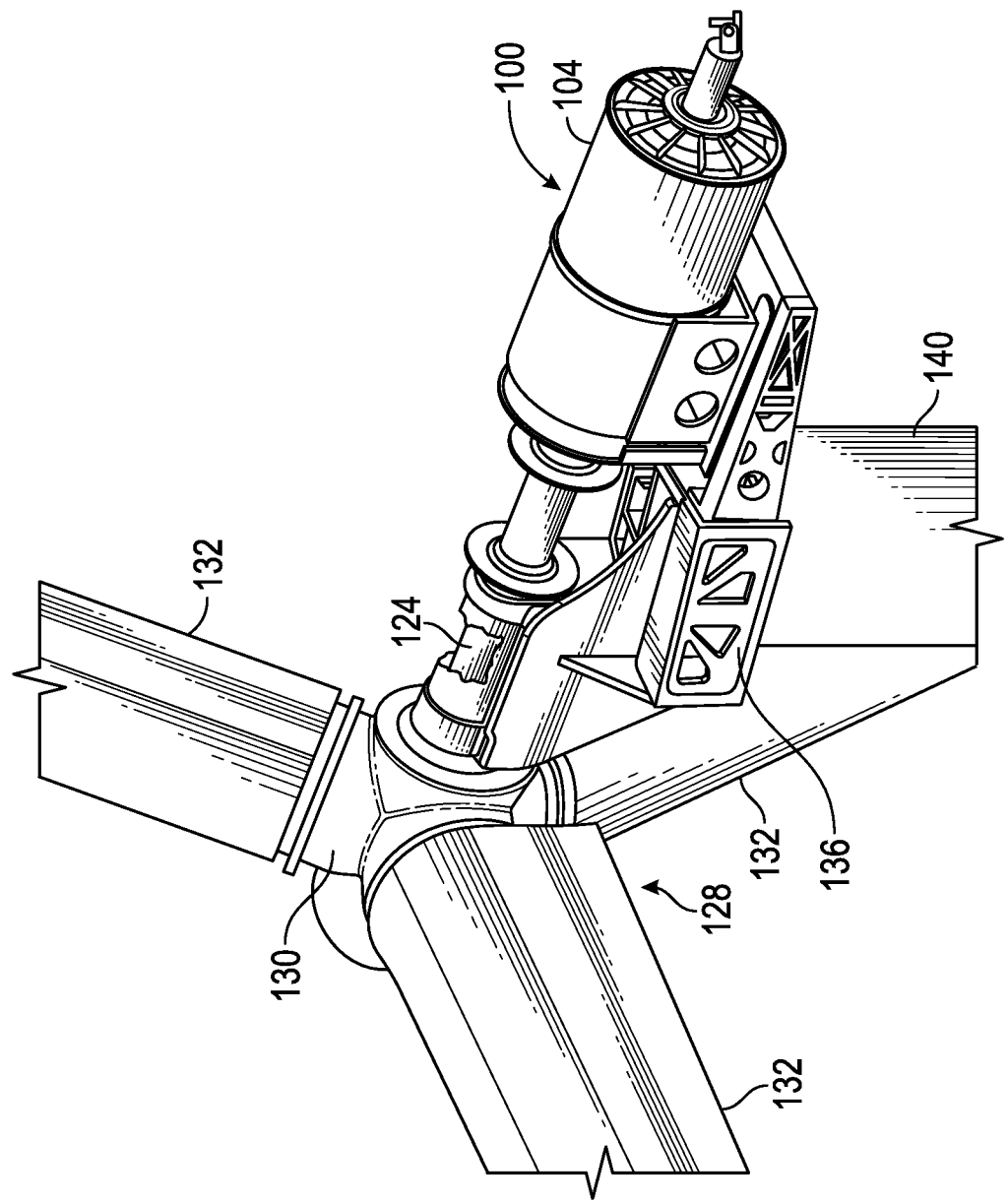
FIG. 2 is a perspective view of a superconducting electrical machine driven by a wind turbine, in accordance with one embodiment.

Referring to FIG. 2, in some embodiments, a superconducting electrical machine 100 is driven by a shaft 124 coupled to a wind turbine 128. The wind turbine 128 may include a mainframe 136 supported by a tower 140. In some embodiments, including but not limited to offshore wind applications, the tower 140 may be configured to stand on an ocean floor and withstand tidal action, storms, and other physical impacts of both continuous and transitory natures. In some embodiments, including but not limited to land-based wind applications, the tower 140 may be configured to stand on any kind of terrain and withstand storms and other physical impacts of both continuous and transitory natures.

In various embodiments, a superconducting electrical machine 100 is driven by various prime movers. For example, the superconducting electrical machine 100 may be driven by an engine, such as an engine using oil, gasoline, diesel, or other fossil fuels as a fuel source. The superconducting electrical machine 100 may be driven by a gas turbine. The superconducting electrical machine 100 may be driven by a nuclear reactor steam turbine, such as in a naval submarine. The superconducting electrical machine 100 may be used in various naval contexts, such as with oil, gasoline, or diesel engines; with gas turbines; in coordination with a propulsion motor benefiting from the high specific torque of the superconducting electrical machine 100; etc.

In some embodiments, a wind turbine 128 includes a plurality of blades 132 configured to rotate a shaft 124 when acted upon by a force, such as a force generated by wind. The plurality of blades 132 may extend radially from a central hub 130 which is coupled to the shaft 124, and the plurality of blades 132 may rotate the central hub 130 and in turn rotate the shaft 124 when acted upon by a force. The plurality of blades 132 may include three blades 132 arranged in a circular configuration. In some embodiments, the plurality of blades 132 are arranged in a circular configuration and spaced equidistantly from each other, the plurality of blades being spaced by approximately 60 degrees from each other. In some embodiments, a wind turbine 128 drives a first shaft, which is coupled to a second shaft for driving a superconducting electrical machine 100. An intermediate shaft may also be coupled between the first shaft and the second shaft.

Figure 3:
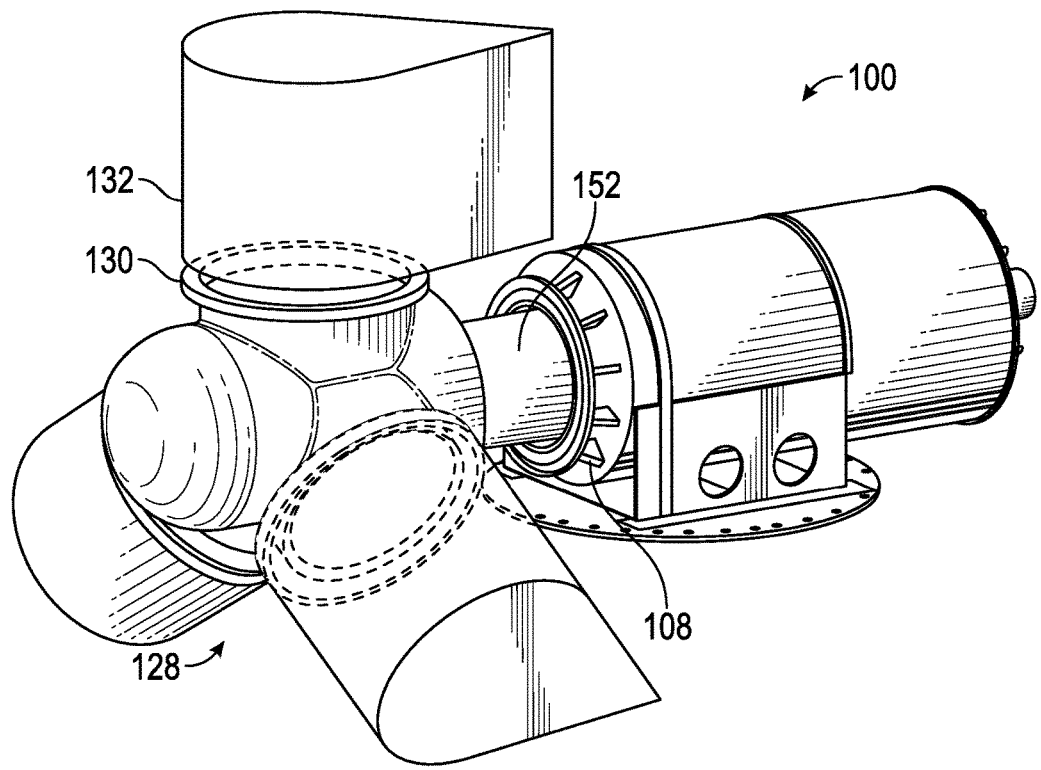
FIG. 3 is a perspective view of a superconducting electrical machine driven by a wind turbine, in accordance with one embodiment.

Referring to FIG. 3, in some embodiments, a wind turbine 128 includes a plurality of blades 132 extending from a central hub 130. The central hub 130 may be coupled to a shaft 152. The shaft 152 may pass directly through the bracket 108 at the drive end 112 of the superconducting electrical machine, into a rotor (e.g. rotor 150 shown in FIG. 7). The shaft 152 may be coupled to the rotor 150 to directly rotate the rotor 150 and drive the superconducting electrical machine 100. In some embodiments, the shaft 152 rotates the rotor 150 at a constant rate. In some embodiments, the superconducting electrical machine 100 is configured for variable speed operation. A voltage regulator may be used to account for variations in voltage due to variations in the rotation rate of the shaft. In some embodiments, the shaft 152 is configured to rotate the rotor at approximately 10 revolutions per minute.

Figure 4:
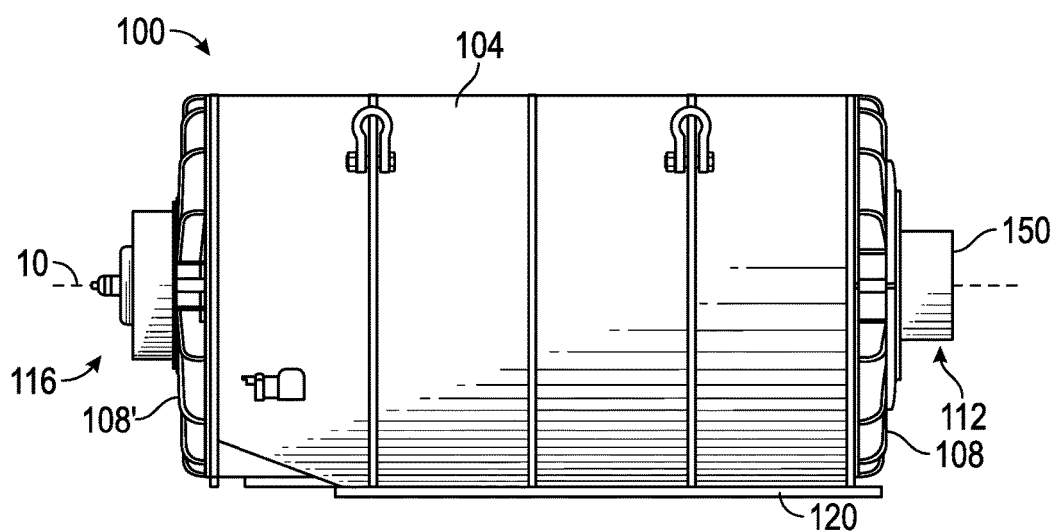
FIG. 4 is a side view of the superconducting electrical machine of FIG. 1.

Referring to FIG. 4, a side view of a superconducting electrical machine 100 is shown. The superconducting electrical machine 100 may include a stator frame 104, a pair of bracket assemblies 108, 108' disposed at a drive end 112 and at a non-drive end 116 of the superconducting electrical machine 100, and a base 120 disposed below the stator frame 104 to support the superconducting electrical machine 100. A longitudinal axis 10 may pass through the superconducting electrical machine 100. The superconducting electrical machine 100 may include a rotor 150, the rotor 150 being coannular with the stator frame 104. The rotor 150 may be supported in the superconducting electrical machine 100 by the pair of bracket assemblies 108, 108'.

Figure 5:
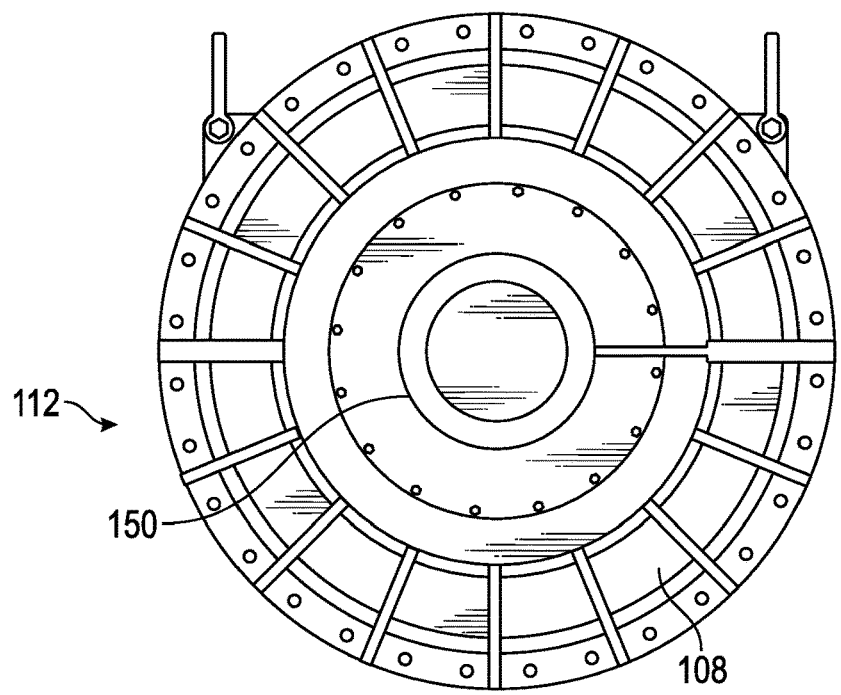
FIG. 5 is an end view of the drive end of the superconducting electrical machine of FIG. 1.

Referring to FIG. 5, an end view of a superconducting electrical machine 100 including a drive end 112 is shown. The drive end 112 may be located at an end region of the superconducting electrical machine 100 proximate to a prime mover, such as a wind turbine. Superconducting electrical machine may include a bracket assembly 108 disposed at the drive end 112. The bracket assembly 108 may surround and be coannular with a bearing (e.g., bearing 180 shown in FIG. 9). In some embodiments, the bearing 180 is an anti-friction bearing 180, and the bearing 180 accommodates rotation of a rotor 150. The bearing 180 may surround and be coannular with the rotor 150. In some embodiments, the bearing 180 receives a shaft from a prime mover for rotating the rotor.

Figure 6:
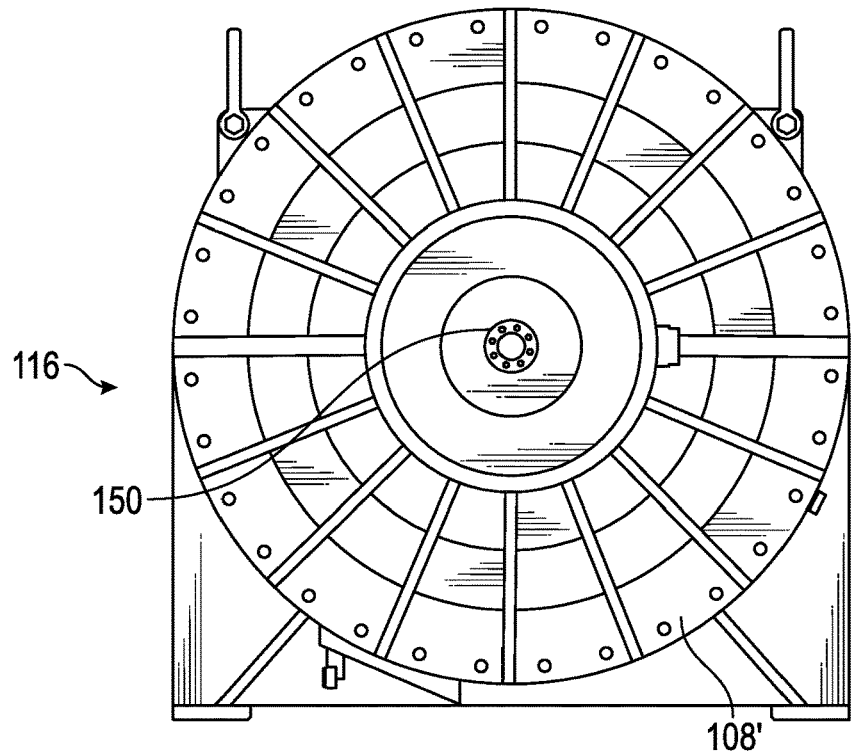
FIG. 6 is an end view of the non-drive end of the superconducting electrical machine of FIG. 1.

Referring to FIG. 6, an end view of a superconducting electrical machine 100 including a non-drive end 116 is shown. The non-drive end 116 may be located at an end region of the superconducting electrical machine 100 distal from a prime mover, such as a wind turbine, and opposite from a drive end (e.g. drive end 112 shown in FIG. 5). The superconducting electrical machine 100 may include a bracket assembly 108' disposed at the non-drive end 116. The bracket assembly 108' may surround and be coannular with a bearing (e.g., bearing 180' shown in FIG. 9). In some embodiments, the bearing 180' is an anti-friction bearing 180', and the bearing 180' accommodates rotation of a rotor 150. The bearing 180' may surround and be coannular with the rotor 150.

Figure 7:
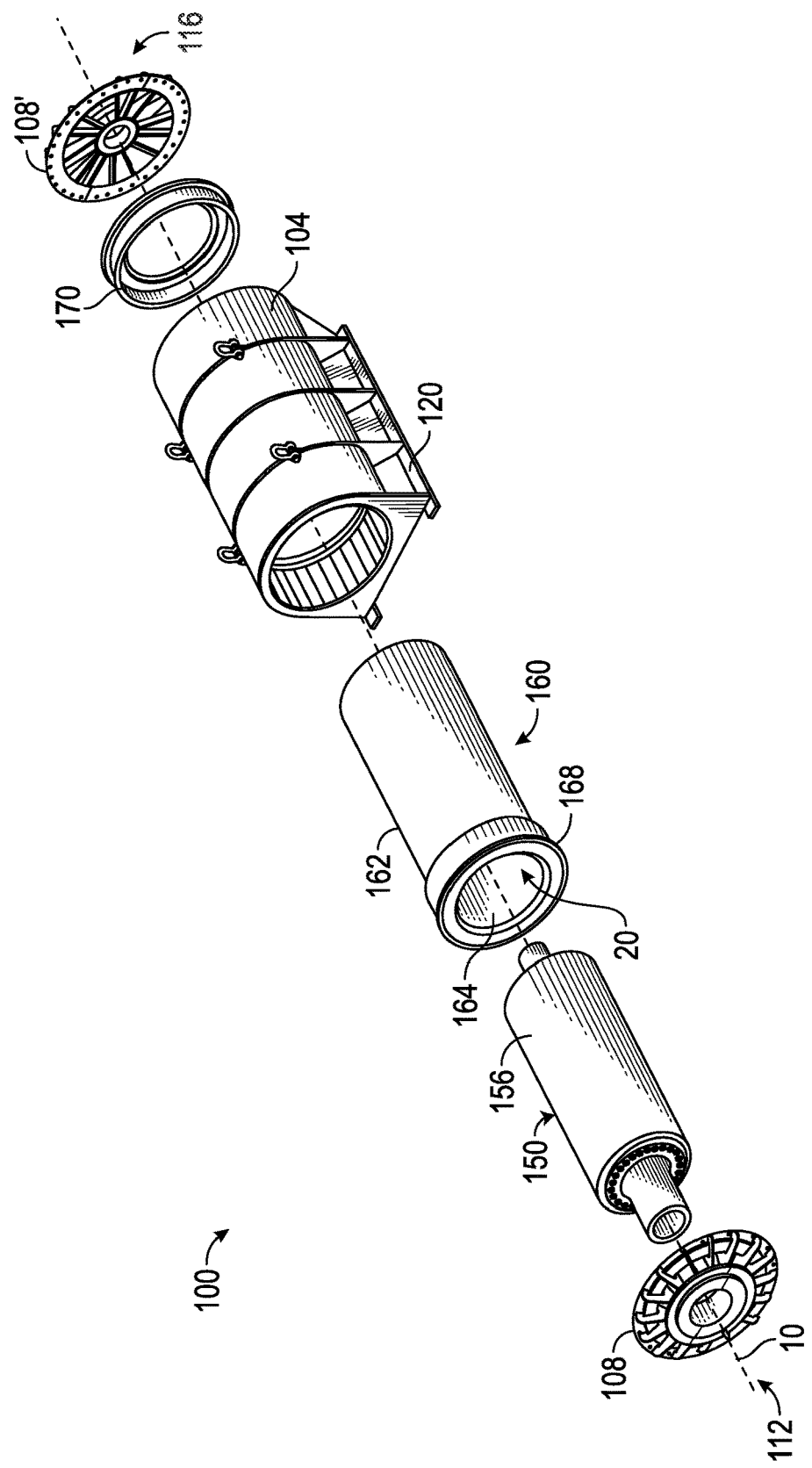
FIG. 7 is an exploded perspective view of the superconducting electrical machine of FIG. 1.

Referring to FIG. 7, an exploded view of various components of a superconducting electrical machine 100 are shown. The superconducting electrical machine 100 may include a stator frame 104 attached to a base 120. The superconducting electrical machine 100 may include a pair of bracket assemblies 108 disposed at a drive end 112 and a non-drive end 116 of the superconducting electrical machine 100. The superconducting electrical machine 100 may include a rotor 150 supported by the bracket assemblies 108, 108' and which rotates about a longitudinal axis 10.

The superconducting electrical machine 100 may include a stator 160. As shown in FIG. 7, the stator 160 includes an active section 162, and superconductive processes may occur in the active section 162. FIG. 7 also shows a stator non-drive re-entrant end 170 disposed proximate to the non-drive end 116 of the superconducting electrical machine 100. Re-entrant ends, such as the stator non-drive re-entrant end 170, provide an elongated pathway for heat transfer from an environment surrounding the superconducting electrical machine 100 to the stator 160, improving the ability of the superconducting electrical machine 100 to maintain the superconducting temperatures required for superconductive processes to occur. Re-entrant ends also provide structural support against the many forces within the machine and flexibility for thermal movements (e.g., electromagnetic forces, lateral loading, etc., while accommodating radial and axial thermal movements). For example, re-entrant ends, such as the stator non-drive re-entrant end 170, provide radial and axial flexibility to accommodate thermal expansion and/or thermal contraction of the active section 162. An inner surface of the stator 160 defines a cavity in which the rotor 150 may be disposed. In some embodiments, the inner surface is defined by a bore tube of a stator cryostat 164 which maintains a vacuum environment within the stator 160. The stator cryostat 164 may be composed of a bore tube assembly including a cylindrical tube and end caps, the stator re-entrant ends 168, 170, and the stator frame 104. The stator cryostat 164 components may be sealed (e.g., hermetically sealed) and/or welded together to complete the stator cryostat 164 in order to provide the vacuum environment for the stator 160.

An outer surface of the rotor 150 may be defined by a rotor cryostat 156 which maintains a vacuum environment within the rotor 150. Cryostats, such as the stator cryostat 164 and the rotor cryostat 156, improve the ability of the superconducting electrical machine 100 to maintain a superconducting environment, by providing a vacuum environment surrounding each of the stator 160 and the rotor 150. In some embodiments, an air gap remains between the stator cryostat 164 and the rotor cryostat 156 after the rotor 150 has been positioned within the cavity 20 (see, e.g., air gap 184 shown in FIGS. 9, 10B).

Generally, a superconducting temperature may be any temperature at or below which a conductor is able to superconduct. For example, a superconducting temperature may be any temperature at which superconducting windings are able to superconduct (see, e.g., rotor windings 216, stator windings 228 shown in FIG. 10B). A superconducting temperature may include cryogenic temperatures. In some embodiments, a superconducting temperature is a temperature at or below a boiling point temperature of a coolant, such as a boiling point temperature of nitrogen, helium, or other coolants. In some embodiments, a superconducting temperature is a temperature greater than zero Kelvin and less than or equal to 93 Kelvin. In some embodiments, a superconducting temperature is a temperature greater than or equal to 4 Kelvin and less than or equal to 35 Kelvin.

In some embodiments, as shown in FIG. 7, a re-entrant end, such as stator non-drive re-entrant end 170, is provided separately from the stator 160, before being attached to the stator 160. In some embodiments, a re-entrant end may be provided already being continuous with an adjacent component of the stator 160 or the rotor 150, such as a torque tube or a composite layer. In some embodiments, both re-entrant ends 168, 170 of the stator 160 may be provided as separate devices from the stator 160. The stator drive re-entrant end 168 may be pre-bolted to the stator 160, while the stator non-drive re-entrant end 170 may not prebolted, to facilitate an assembly of a superconducting electrical machine 100. In some embodiments, both re-entrant ends 172, 174 of the rotor 150 may be provided as separate devices from the rotor 150.

Figure 8:
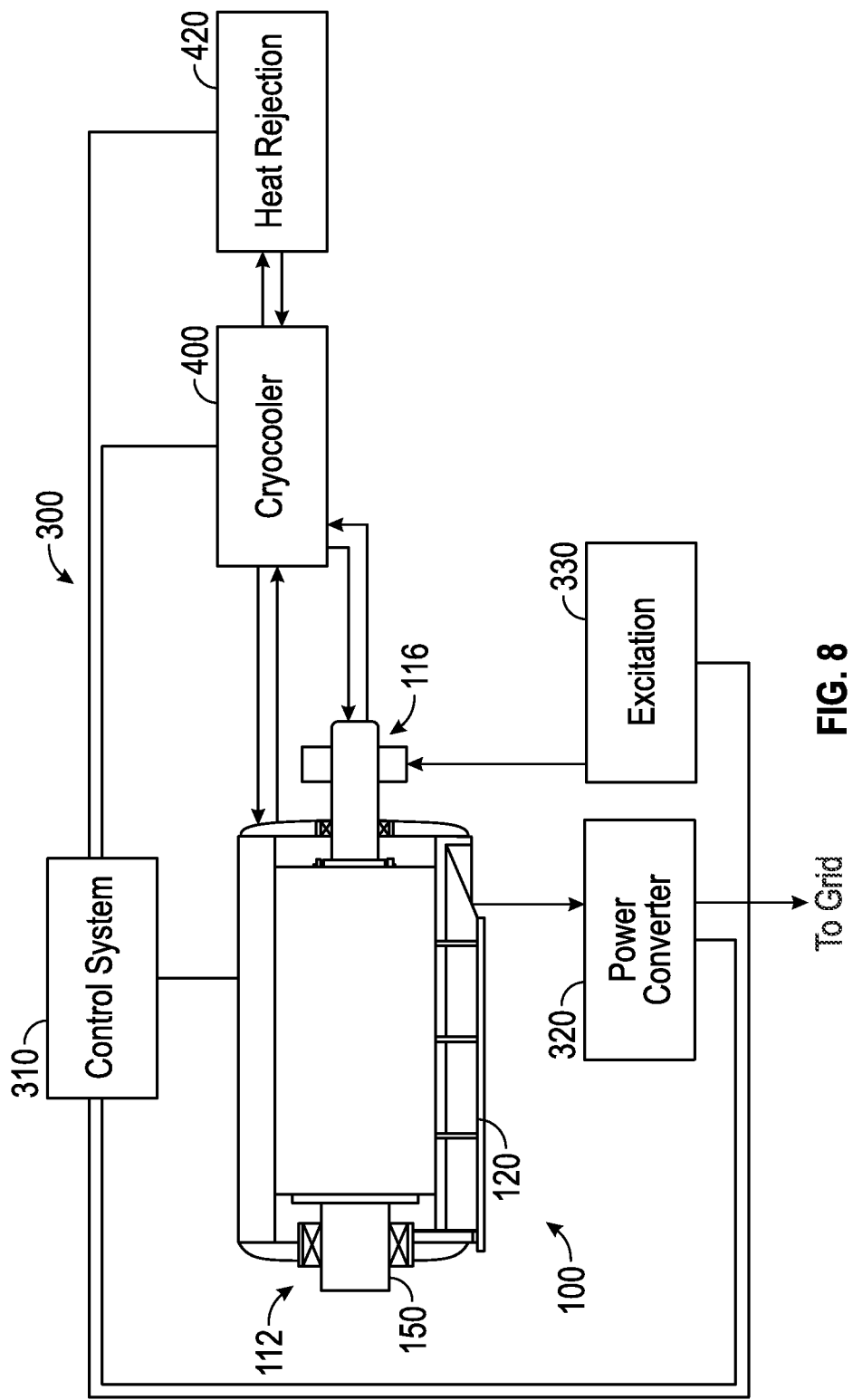
FIG. 8 is a schematic diagram of a system including a superconducting electrical machine in accordance with one embodiment.

Referring to FIG. 8, a system 300 for operating a superconducting electrical machine 100 is shown. The system 300 includes a superconducting electrical machine 100, a control system 310, a power converter 320, an excitation device 330, a cryocooler 400, and a heat rejection unit 420. The control system 310 may control operation of the various components of system 300. For example, the control system 310 may modulate the rotation of a rotor 150, depending on factors including but not limited to the rotation rate of a shaft from a prime mover such as a wind turbine (wind turbine 128 shown in FIG. 2).

A cryocooler 400 may control the temperatures and flow rates of coolants provided to a superconducting electrical machine 100, in order to control a temperature within the superconducting electrical machine 100. For example, the cryocooler 400 may control a temperature of a stator 160, a temperature of a rotor 150, a temperature of components of the stator 160 or of the rotor 150, etc. The cryocooler 400 may control the flow rates of the coolants in order to maintain a temperature within the superconducting electrical machine 100 at or below a superconducting temperature. Temperatures within the superconducting electrical machine 100 may be measured in a variety of ways (e.g., temperatures may be measured using sensors disposed throughout the superconducting electrical machine 100, etc.).

The power converter 320 may convert electrical energy generated by the superconducting electrical machine 100 to a form compatible with electrical components outside of system 300. For example, the superconducting electrical machine 100 may generate variable frequency power, which may be rectified and inverted before transmission to an electrical grid.

The excitation device 330 may provide an excitation current to the rotor 150 so that the rotor windings 216 of the rotor 150 may generate a magnetic field. In some embodiments, control system 310 controls operation of the excitation device 330 to dynamically modulate the excitation current in response to conditions including but not limited to wind conditions. In some embodiments, a change in the excitation current leads to an inductive voltage, requiring power to be supplied from the excitation device 330 to the rotor 150. For example, as shown in FIG. 8, the excitation device 330 provides power to the rotor 150 near the non-drive end 116 region of the rotor 150. In some embodiments, the excitation current is modulated over long time constants (e.g., several minutes) in response to conditions including but not limited to wind conditions and/or for providing variable speed operation.

The cryocooler 400 may be coupled to a superconducting electrical machine 100, and the cryocooler 400 may drive a cooling cycle, such as a reverse-Brayton cycle, in order to provide coolants to the superconducting electrical machine 100. The coolants may pass from the cryocooler 400, which has cooled the coolants to a temperature at or below a superconducting temperature, through cooling tubes in the active sections of a rotor 150 and a stator (e.g., stator 160 shown in FIG. 7; rotor cooling tubes 220 and stator cooling tubes 224 shown in FIGS. 10A-10B). The coolants may draw thermal energy from the active sections, and particularly the superconductors of the rotor 150 and the stator 160 (e.g., rotor windings 216 and stator windings 228 shown in FIGS. 14A-14B). By drawing thermal energy from the active sections, the coolants help maintain the superconductors at or below a superconducting temperature. After drawing thermal energy from the active sections, the relatively warm coolants may return to the cryocooler 400, and the cycle may begin again.

In some embodiments, the coolant includes helium. Cryocooler 400 may include a Turbo-Brayton cryocooler which provides a coolant of helium (e.g., helium gas having a temperature of approximately 15-20 Kelvin, etc.) to a rotor 150 and to a stator (e.g., stator 160 shown in FIG. 7). Cryocooler 400 may also provide a coolant of helium as an additional heat sink to the stator 160 (e.g., helium gas having a temperature of 60 Kelvin, etc.).

Figure 9:
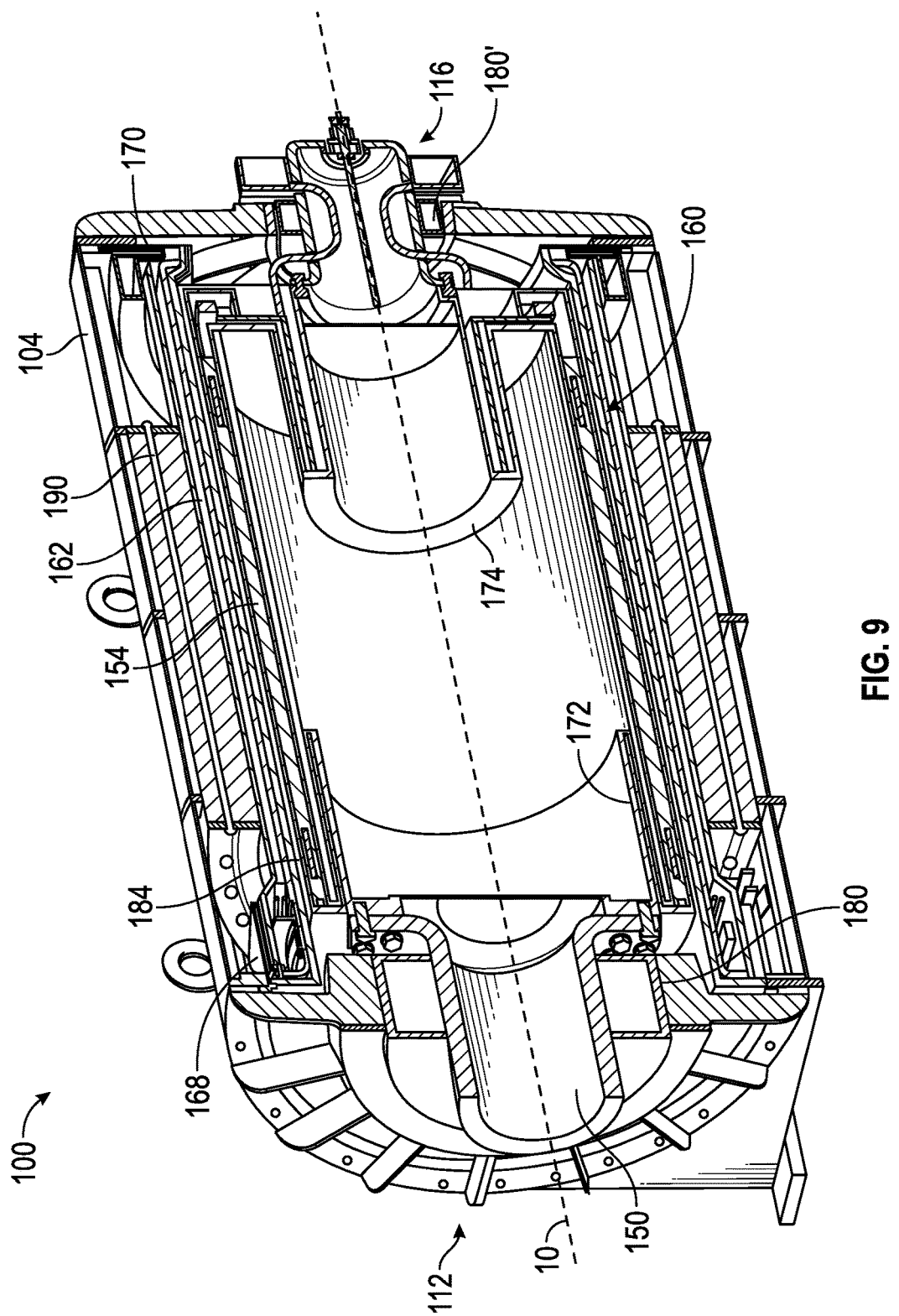
FIG. 9 is a cross-sectional view of a superconducting electrical machine in accordance with one embodiment.

Referring to FIG. 9, a cross-section of a superconducting electrical machine 100 is shown. Superconducting electrical machine 100 includes a rotor 150 and a stator 160. The rotor 150 may be rotatably coupled to a shaft and may be rotated by the shaft about a longitudinal axis 10 when the shaft rotates (e.g., shaft 124 shown in FIG. 2, etc.). The rotor 150 may be supported in the superconducting electrical machine 100 by a pair of bearings 180, 180' which surround and are coannular with the rotor 150, and are disposed at the drive end 112 and the non-drive end 116 of the superconducting electrical machine 100. A pair of bracket assemblies 108, 108' may surround and support the pair of bearings 180, 180', and in turn, support the rotor 150. The rotor 150 may include a rotor active section 154, in which superconductive processes occur. The rotor 150 may include a rotor re-entrant drive end 172 and a rotor re-entrant non-drive end 174. The re-entrant ends 172, 174 may provide an extended path along which thermal conduction occurs between the rotor 150 and an environment surrounding the superconducting electrical machine 100, which increases a resistance to thermal conduction, thus facilitating maintaining the active section 154 of the rotor 150 at or below a superconducting temperature. Re-entrant ends, such as the rotor re-entrant drive end 172 and a rotor re-entrant non-drive end 174, also provide radial and axial flexibility to accommodate various stresses and forces in the superconducting electrical machine 100, including thermal expansion and/or thermal contraction of the active section 154.

The stator 160 may be disposed generally surrounding and coannular with the rotor 150. The stator 160 may be supported by stator frame 104. The stator 160 may include a stator re-entrant drive end 168 and a stator re-entrant non-drive end 170. The re-entrant ends 168, 170 may provide an extended path along which thermal conduction occurs between the stator 160 and an environment surrounding the superconducting electrical machine 100, which increases a resistance to thermal conduction, thus facilitating maintaining the active section 162 of the stator 160 at or below a superconducting temperature. Re-entrant ends, such as the stator re-entrant drive end 168 and the stator re-entrant non-drive end 170, also provide radial and axial flexibility to accommodate various stresses and forces in the superconducting electrical machine 100, including thermal expansion and/or contraction of the active section 162.

The stator 160 may be surrounded by an electromagnetic shield 190 which minimizes communication of electrical signals and energy across a boundary of the stator frame 104 and the superconducting electrical machine 100. In some embodiments, the electromagnetic shield is a laminated shield. In some embodiments, the electromagnetic shield is a back iron.

Figure 10A:
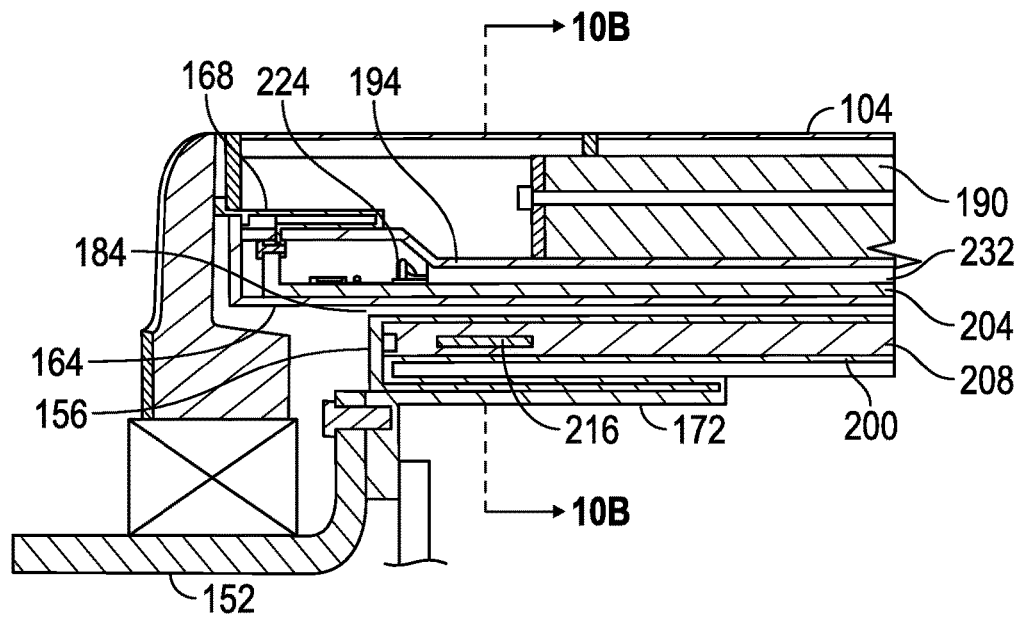
FIG. 10A is a sectional view of a superconducting electrical machine in accordance with one embodiment.
Figure 10B:
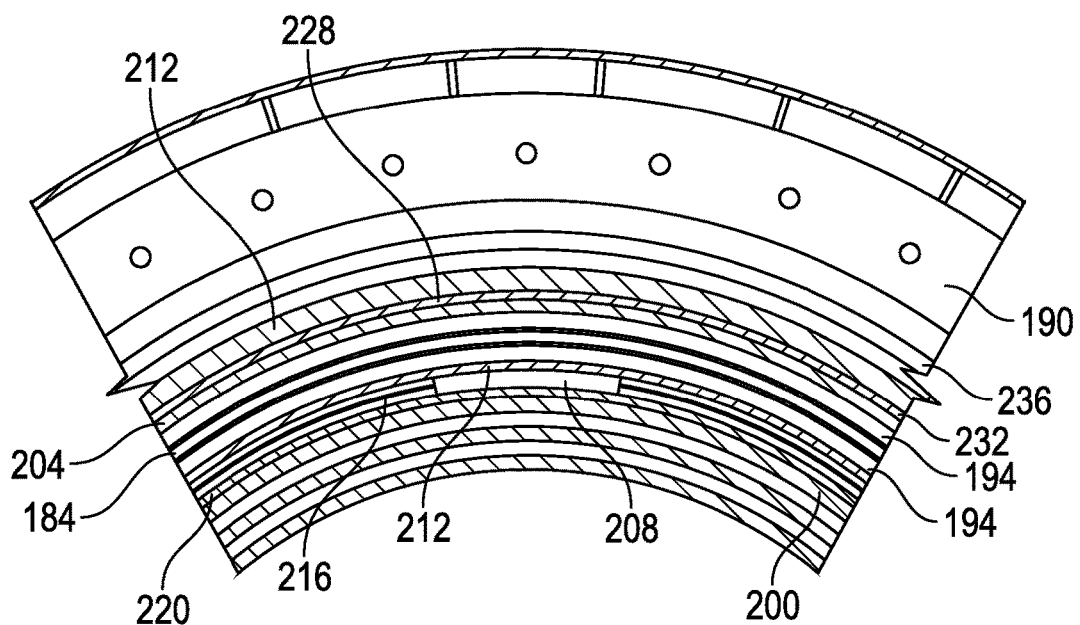
FIG. 10B is a sectional view of the superconducting electrical machine of FIG. 10A.

Referring to FIGS. 10A-10B, a section of a superconducting electrical machine 100 is shown. In some embodiments, a rotor (e.g., rotor 150 shown in FIG. 9) includes a rotor torque tube 200 surrounded by a rotor composite 208. The rotor composite 208 may include an epoxy resin and filler configured to compensate for a volume change of the rotor. The rotor composite 208 may surround and support rotor windings 216 and rotor cooling tubes 220. Rotor cooling tubes 220 may be disposed between the rotor torque tube 200 and the rotor windings 216 in order to draw thermal energy from the rotor windings 216. An air gap 184 may be provided between the rotor 150 and a stator (e.g., stator 160 shown in FIG. 7), when the rotor 150 is positioned within a cavity 20 defined by the stator 160. The stator 160 may be disposed coannular with the rotor 150 and on an opposite side of the air gap 184. The stator 160 may include stator cooling tubes 224 to draw thermal energy from stator windings 228. A stator composite 232 may surround and support the stator windings 228 and stator cooling tubes 224. The stator composite 232 may be surrounded by a stator retention layer 212. An electromagnetic shield 190 may be provided along an outer region of the stator 160 to provide magnetic isolation to the superconducting electrical machine 100.

The rotor composite 208 may be surrounded by a rotor retention layer 212. The rotor retention layer 212 may provide additional structural support to the rotor 150 during a change in temperature from a first temperature to a second temperature, and may also provide additional structural support to the rotor 150 during operation of the superconducting electrical machine 100.

Figure 11:
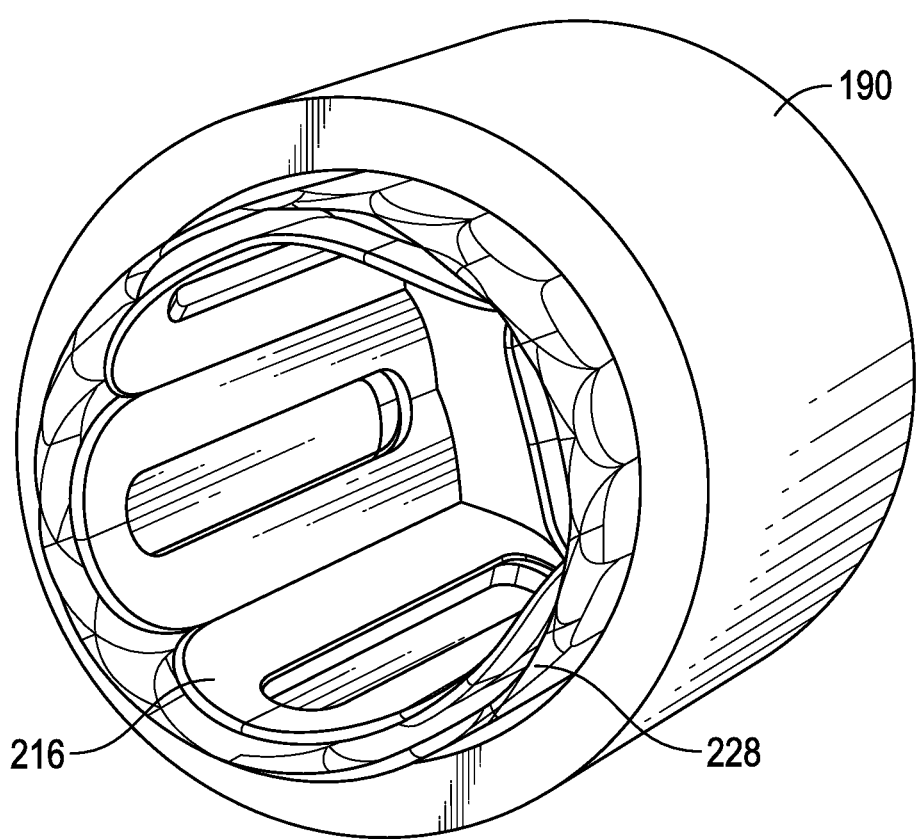
FIG. 11 is a perspective view of the active section and rotor windings and stator windings of a superconducting electrical machine in accordance with one embodiment.

Referring to FIG. 11, a superconducting electrical machine 100 including active sections in which superconducting processes occur is shown. The superconducting electrical machine 100 includes an electromagnetic shield 190. The active sections include stator windings 228. The superconducting electrical machine 100 also includes a rotor (e.g. rotor 150 shown in FIG. 9) including rotor windings 216.

In some embodiments, superconductors, such as rotor windings 216 and stator windings 228, are arranged in a multiple-pole configuration. For example, in FIG. 11, rotor windings 216 are shown in a six-pole configuration. In various embodiments, superconductors may be arranged in various configurations (e.g. 2 poles, 4 poles, 10 poles, etc.). In some embodiments, the superconducting windings, such as rotor windings 216 and stator windings 228, may be arranged in layers. For example, in FIG. 11, the stator windings 228 are shown in a three-layer arrangement.

Figure 12:
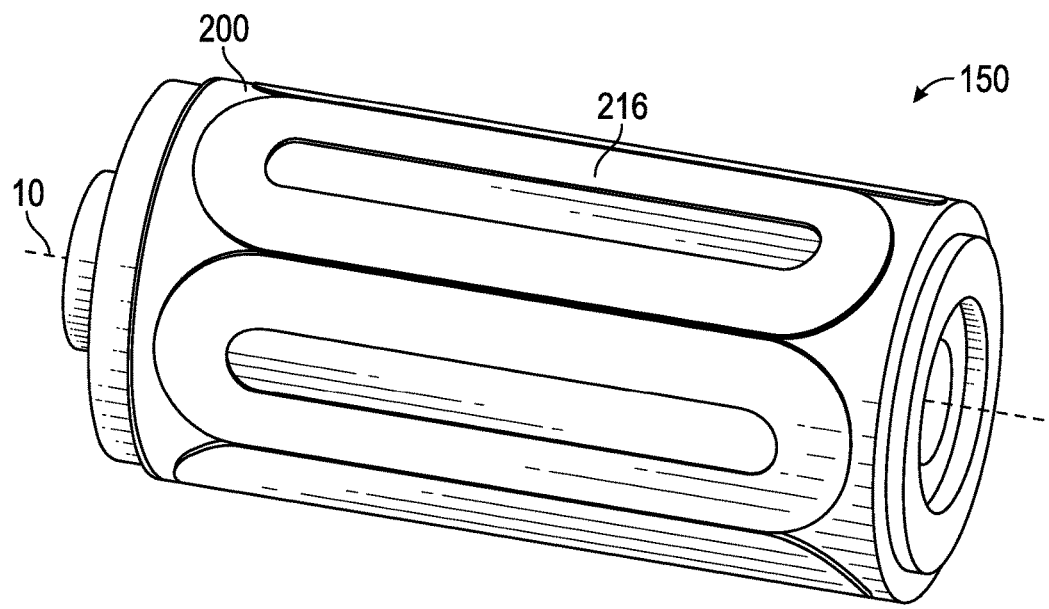
FIG. 12 is a perspective view of the active section of a rotor showing the winding placement for a superconducting electrical machine in accordance with one embodiment.

Referring to FIG. 12, a portion of a rotor 150 is shown. The rotor 150 may rotate about a longitudinal axis 10. The rotor 150 may include a rotor torque tube 200. The rotor torque tube 200 may be coannular with and surround an outer surface of a shaft, and may transfer mechanical rotational energy from the shaft to a rotor active section (e.g., rotor active section 154 shown in FIG. 9) that is coannular with and surrounds an outer surface of the torque tube 200. The rotor active section 154 may include a rotor composite which supports rotor windings 216 and rotor cooling tubes (e.g., rotor composite 208, rotor cooling tubes 220 shown in FIG. 10A). Rotor cooling tubes 220 may be disposed along an outer surface of the torque tube 200, allowing for heat transfer from the rotor active section 154 to coolants passing through the rotor cooling tubes 220.

Figure 13:
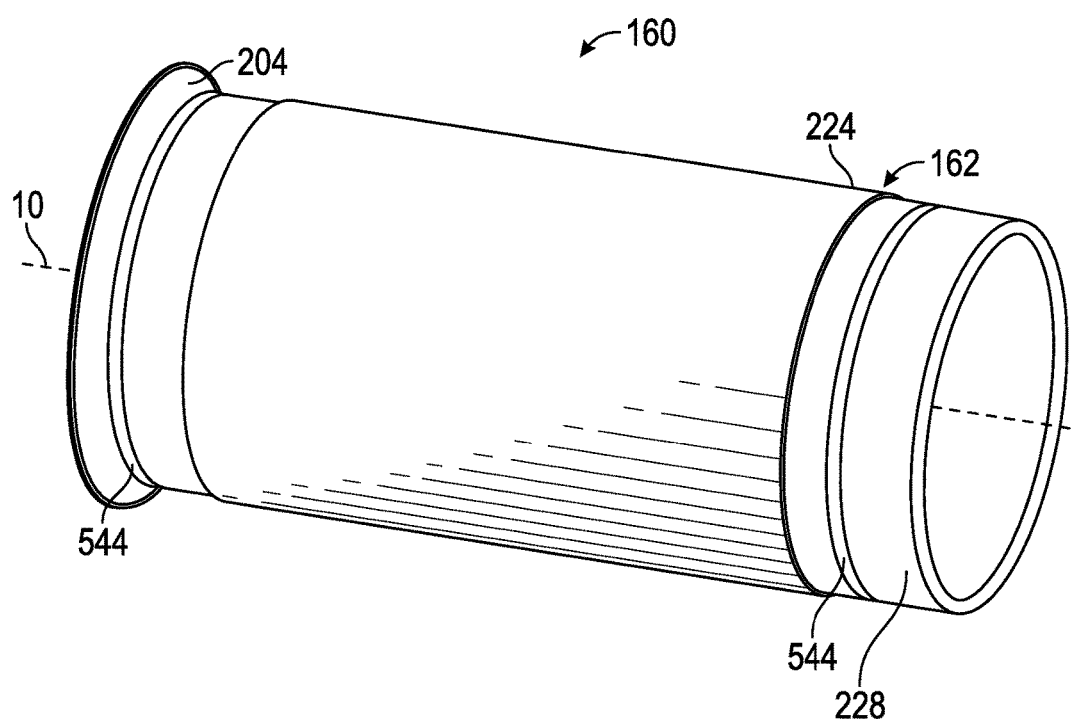
FIG. 13 is a perspective view of the active section and outer layers of a stator of a superconducting electrical machine in accordance with one embodiment.

Referring to FIG. 13, a portion of a stator 160 is shown. The stator 160 may be coannular with a longitudinal axis 10. The stator 160 may include an active section 162 including a stator composite (e.g., stator composite 232 shown in FIG. 10B) which supports stator windings (e.g., stator windings 228 shown in FIG. 11) and stator cooling tubes 224. Stator cooling tubes 224 may be disposed along an inner surface of the stator composite 232, allowing for heat transfer from the active section 162 to coolants passing through the stator cooling tubes 224. In some embodiments, heat sink rings 544 are disposed along an outer circumference of the stator 160, in order to provide a flow of coolants at a temperature that is greater than the temperature of the coolants passing through the cooling tubes 224. In some embodiments, the coolants passing through the heat sink rings 544 include helium at a temperature of 60 Kelvin.

Figure 14A:
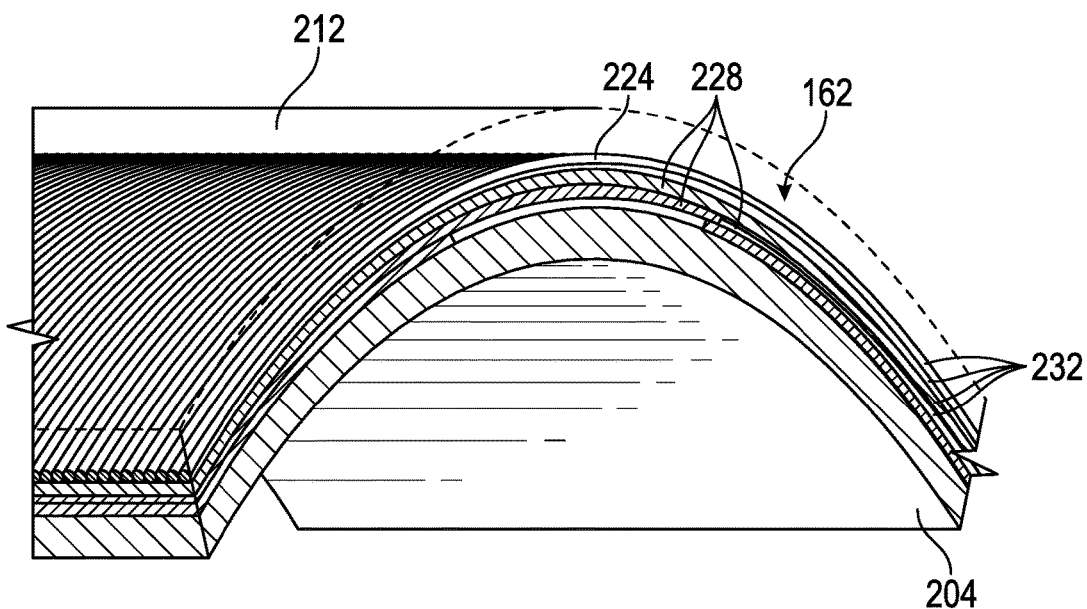
FIG. 14A is a partial view of the active section and various layers of a stator of a superconducting electrical machine in accordance with one embodiment.

Referring to FIG. 14A, various layers of a stator (e.g., stator 160 shown in FIG. 9) are shown. In some embodiments, the stator 160 includes a stator torque tube 204 supporting a stator active section 162. A stator composite 232 supports stator windings 228 and stator cooling tubes 224. A stator retention layer 212 may be disposed along an outer surface of the stator composite 232 and may provide additional structural support to the stator 160 during a change in temperature from a first temperature to a second temperature, as well as during operation of the superconducting electrical machine 100 at or below a superconducting temperature. Stator cooling tubes 224 may be disposed along an outer surface of the stator composite 232, in order to provide a flow of coolants at or below a superconducting temperature.

Figure 14B:
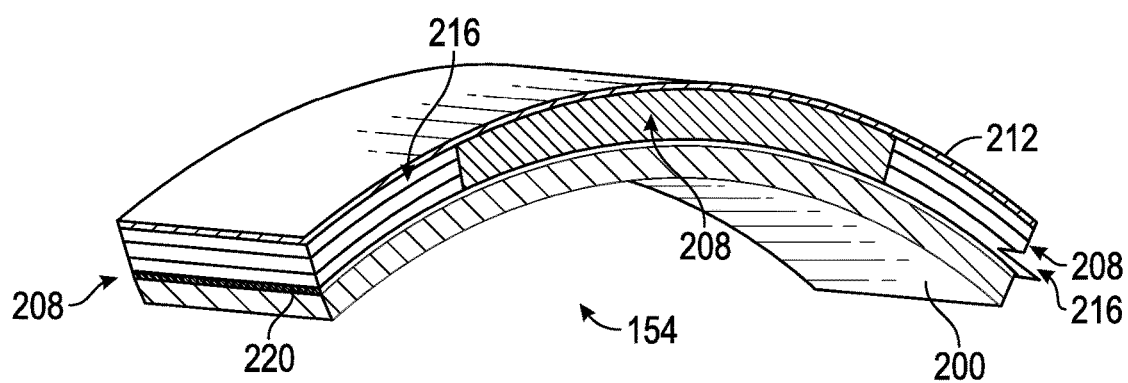
FIG. 14B is a partial view of the active section and various layers of a rotor of a superconducting electrical machine in accordance with one embodiment.

Referring to FIG. 14B, various layers of a rotor (e.g., rotor 150 shown in FIG. 9) are shown. In some embodiments, the rotor 150 includes a rotor torque tube 200 supporting a rotor active section 154. A rotor composite 208 supports rotor windings 216 and rotor cooling tubes 220. A rotor retention layer 212 may be disposed along an outer surface of the rotor composite 208 and may provide additional structural support to the rotor 150 during a change in temperature from a first temperature to a second temperature, as well as during operation of the superconducting electrical machine 100 at or below a superconducting temperature. Rotor cooling tubes 220 may be disposed between the rotor torque tube 200 and the rotor active section 154 in order to provide a flow of coolants at a temperature at or below a superconducting temperature.

Referring to FIG. 15, a rotor (e.g., rotor 150 shown in FIG. 9) is shown. Rotor re-entrant drive end 172 provides an extended path along which thermal conduction may proceed between the rotor 150 and an environment surrounding superconducting electrical machine 100. Rotor cooling tubes 220 may be provided along an outer surface of a rotor torque tube 200. In some embodiments, rotor cooling tubes 220 are arranged in a tightly wound configuration in order to maximize the surface area between the rotor cooling tubes 220 and rotor composite 208, in order to maximize the rate of heat transfer from the rotor windings 216 to the coolant passing through the rotor cooling tubes 220.

Figure 16:
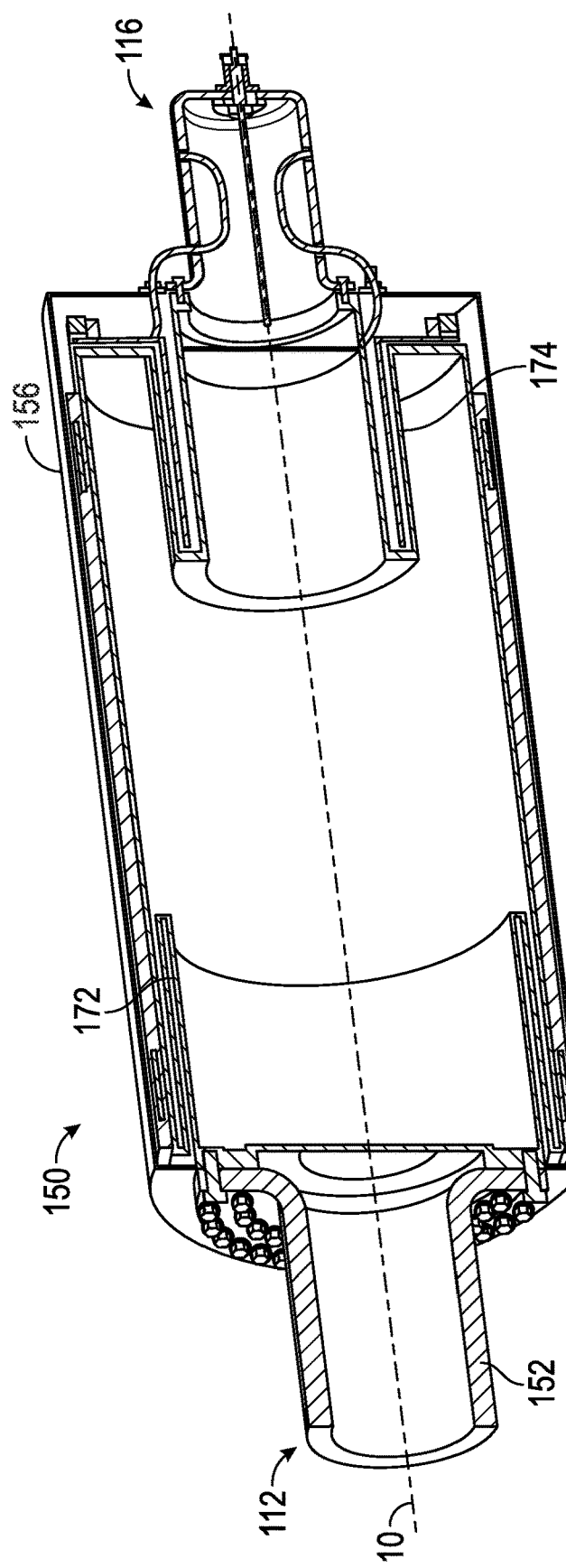
FIG. 16 is a cross-sectional view of a rotor of a superconducting electrical machine in accordance with one embodiment.

Referring to FIG. 16, a rotor 150 having a re-entrant drive end 172 and a re-entrant non-drive end 174 is shown. The rotor 150 is configured to rotate about a longitudinal axis 10. In some embodiments, heat moving from the drive end 112 region of the rotor 150 encounters thermal resistance due to the re-entrant drive end 172 as the heat moves towards an interior of the rotor 150. The interior of the rotor 150 may include any portion of the rotor 150 inward from the drive end 112 region or the non-drive end 116 region (e.g., any portion of the rotor 150 disposed at a radius less than an outer radius of the rotor 150; any portion of the rotor 150 enclosed by a rotor cryostat 156 as shown in FIG. 9; rotor windings 216, a rotor composite 208; or a rotor torque tube 200 as shown in FIGS. 10A-10B; etc.). In some embodiments, heat distal from the rotor windings 216 encounters thermal resistance due to the re-entrant drive end 172 as the heat moves towards the rotor windings 216.

Figure 17A:
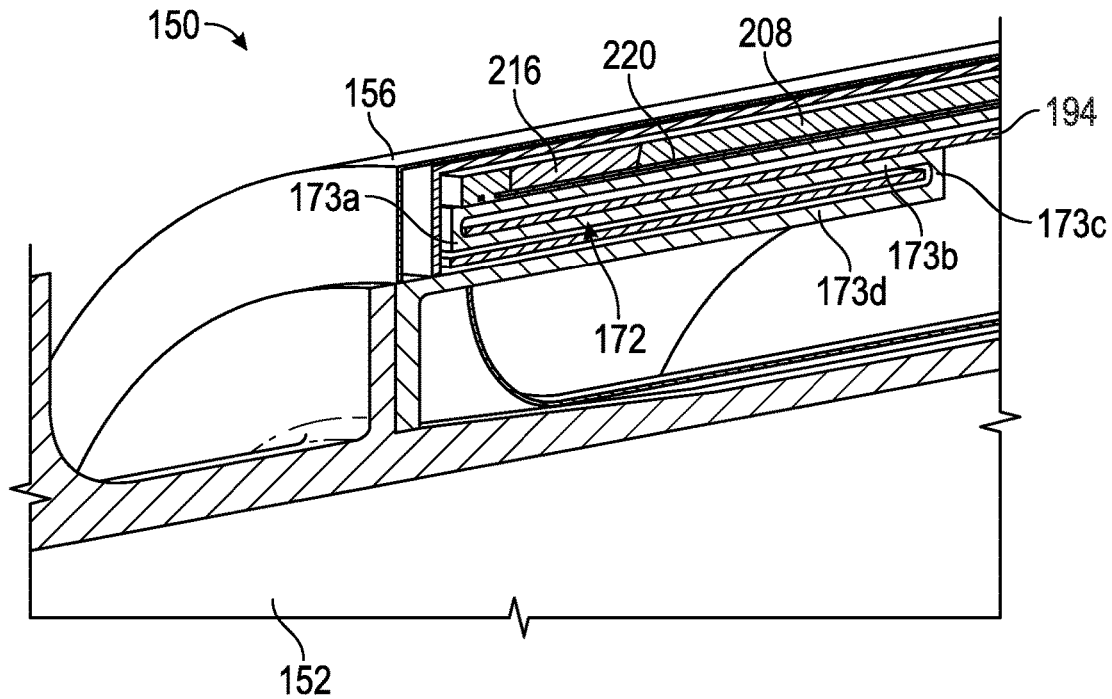
FIG. 17A is a detail view of a re-entrant drive end of a rotor of a superconducting electrical machine in accordance with one embodiment.

Referring to FIG. 17A, a re-entrant drive end 172 of a rotor 150 are shown. In some embodiments, a re-entrant end of the rotor 150, such as the re-entrant drive end 172, includes at least two rotor segments. For example, the re-entrant drive end 172 may include a first rotor segment 173a, a second rotor segment 173b, a third rotor segment 173c, and a fourth rotor segment 173d. The at least two rotor segments 173 are continuous. For example, the at least two rotor segments 173 may be continuous by having been formed in a single piece; the at least two rotor segments 173 may be continuous by being directly connected; etc.

Figure 17B:
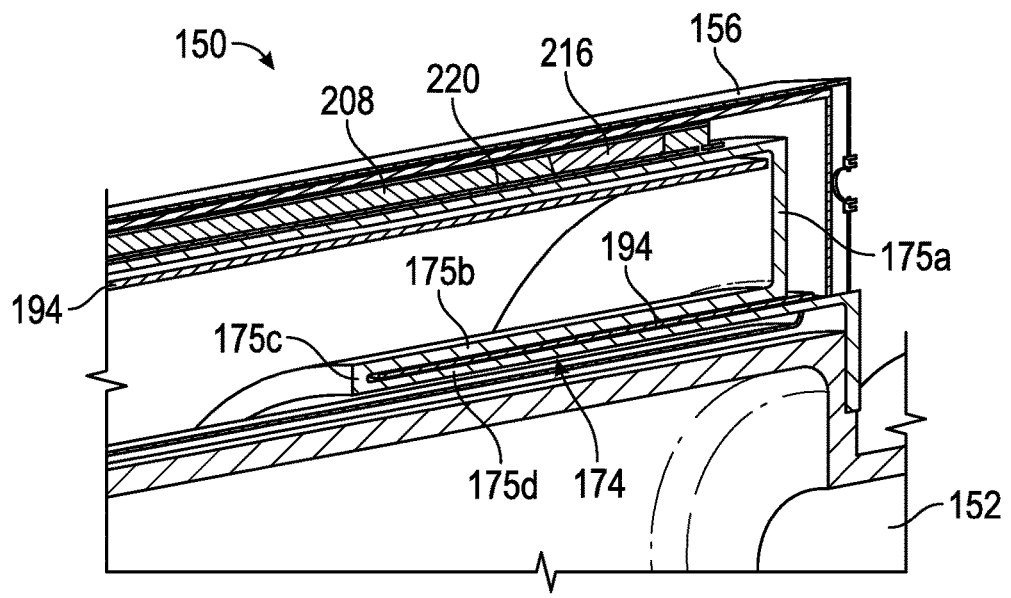
FIG. 17B is a detail view of a re-entrant non-drive end of a rotor of a superconducting electrical machine in accordance with one embodiment.

Referring to FIG. 17B, a re-entrant non-drive end 174 of a rotor 150 is shown. In some embodiments, a re-entrant end of the rotor 150, such as the re-entrant non-drive end 174, includes at least two rotor segments. For example, the re-entrant non-drive end 174 may include a first rotor segment 175a, a second rotor segment 175b, a third rotor segment 175c, and a fourth rotor segment 175d. The at least two rotor segments 175 are continuous. For example, the at least two rotor segments 175 may be continuous by having been formed in a single piece; the at least two rotor segments 175 may be continuous by being directly connected; etc.

In some embodiments, a first rotor segment of a re-entrant end is continuous with a rotor torque tube 200, and a second rotor segment is continuous with a shaft (e.g., shaft 152 shown in FIG. 10A). In some embodiments, the at least two rotor segments includes four rotor segments—a first rotor segment is continuous with a rotor torque tube 200, and a fourth rotor segment is continuous with a shaft (e.g., shaft 152 shown in FIG. 10A).

In some embodiments, a first rotor segment is substantially perpendicular to a plane parallel to the longitudinal axis 10, a second rotor segment is coannular with the longitudinal axis 10, third rotor segment is substantially perpendicular to a plane parallel to the longitudinal axis 10, and a fourth rotor segment is coannular with the longitudinal axis 10 (e.g., rotor segments 173 of a re-entrant drive end 172, rotor segments 175 of a re-entrant non-drive end 174, etc.). A second rotor radius of the second rotor segment is greater than a fourth rotor radius of the fourth rotor segment. The rotor radii may be measured in a plane perpendicular to the longitudinal axis 10, based on a radial distance from a point where the plane perpendicular to the longitudinal axis 10 is intersected by the longitudinal axis 10. In some embodiments, the at least two rotor segments increase a resistance to heat transfer from an outer region of the rotor 150, such as a drive end 112 region or a non-drive end 116 region, to an interior of the rotor 150. In some embodiments, the at least two rotor segments increase a resistance to heat transfer as heat distal from rotor windings (e.g., rotor windings 216 shown in FIG. In some embodiments, the resistance to heat transfer is increased by increasing a resistance to conduction, due to an increased length of a conduction pathway, such as a conduction pathway including the at least two rotor segments.

In some embodiments, a gap is disposed between various components of a rotor 150. For example, referring further to FIG. 17A, a gap may be disposed between a rotor torque tube 200 and a second rotor segment 173b, between a second rotor segment 173b and a fourth rotor segment 173d, etc. In some embodiments, the gap is at least partially filled with an insulator 194. The insulator 194 may be disposed along a surface of a re-entrant end (e.g., a surface of any of the rotor segments 173, etc.). The insulator 194 may be disposed along a surface of the rotor torque tube 200. Although the figures illustrate the insulator 194 in specific locations, the insulator 194 may preferentially be disposed along a variety of surfaces, such as surfaces of a rotor active section (see, e.g., rotor active section 154 shown in FIG. 14B), in order to minimize heat transfer to the rotor active section 154 from other surfaces with greater temperatures. The insulator 194 may preferentially be disposed along surfaces within the rotor 150 that are in thermal communication with other surfaces having greater temperatures. The insulator 194 may be disposed along surfaces that would otherwise have line of sight to surfaces at room temperature, in order to mitigate radiative heat transfer. The insulator 194 may be multi-layer insulation. The insulator 194 may improve the ability of the superconducting electrical machine 100 to maintain a desired temperature by reducing or eliminating heat transfer by radiation between surfaces of the rotor segments. In some embodiments, the vacuum environment provided by a cryostat, such as a rotor cryostat 156, supplements the performance of the multi-layer insulation. In some embodiments, the insulator 194 mitigates or prevents heat transfer by thermal convection or thermal radiation between surfaces of the rotor segments. In some embodiments, the multi-layer insulation has an effective thermal conductivity of approximately 0.1 [milliWatt/meter-Kelvin]. In some embodiments, multi-layer insulation disposed on a surface cooperates with an adjacent vacuum to significantly reduce heat transfer from the surface to another surface.

Figure 18A:
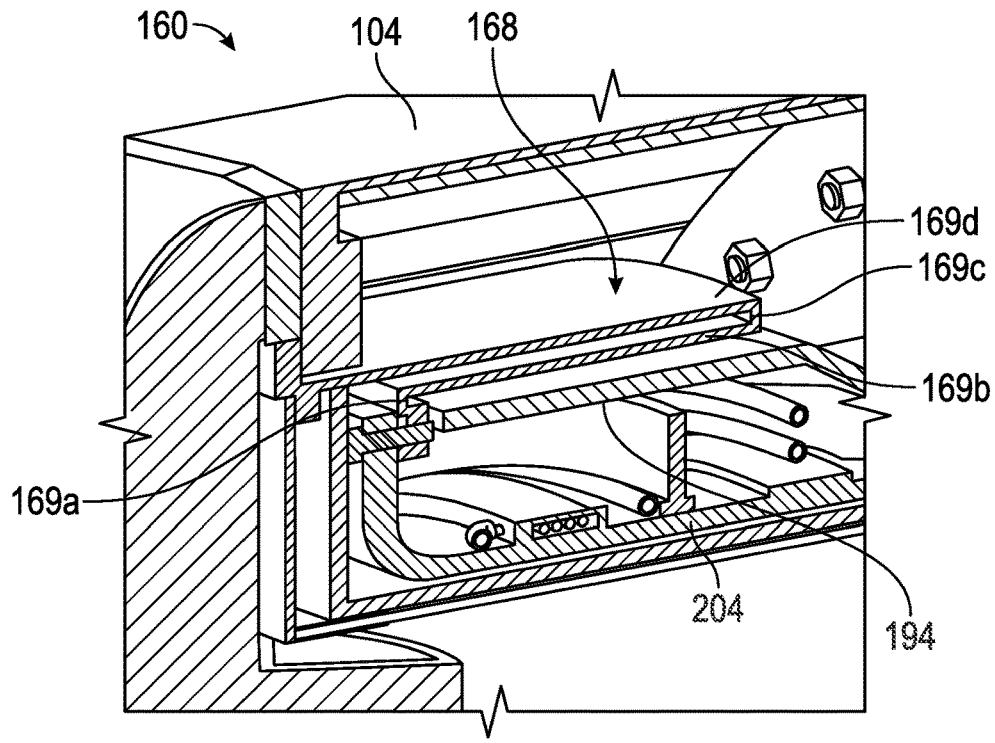
FIG. 18A is a detail view of a re-entrant drive end of a stator of a superconducting electrical machine in accordance with one embodiment.

Referring to FIG. 18A, a re-entrant drive end 168 of a stator 160 is shown. The stator 160 is supported in a stator frame 104. In some embodiments, heat encounters thermal resistance due to the re-entrant drive end 168 as the heat moves towards an interior of the stator 160 (e.g., as the heat moves towards stator windings 228 as shown in FIG. 14A, etc.). In some embodiments, the re-entrant drive end 168 includes at least two stator segments 169. For example, the re-entrant drive end 168 may include a first stator segment 169a, a second stator segment 169b, a third stator segment 169c, and a fourth stator segment 169d. The at least two stator segments 169 are continuous. For example, the at least two stator segments 169 may be continuous by having been formed in a single piece; the at least two stator segments 169 may be continuous by being directly connected; etc.

In some embodiments, a first stator segment of a re-entrant end is continuous with a stator torque tube 200, and a second stator segment is continuous with an outer component of a stator 160 such as a stator frame 104. In some embodiments, the at least two stator segments includes four stator segments, a first stator segment is continuous with a stator torque tube 200, and a fourth stator segment is continuous with an outer component of a stator 160 such as a stator frame 104.

Figure 18B:
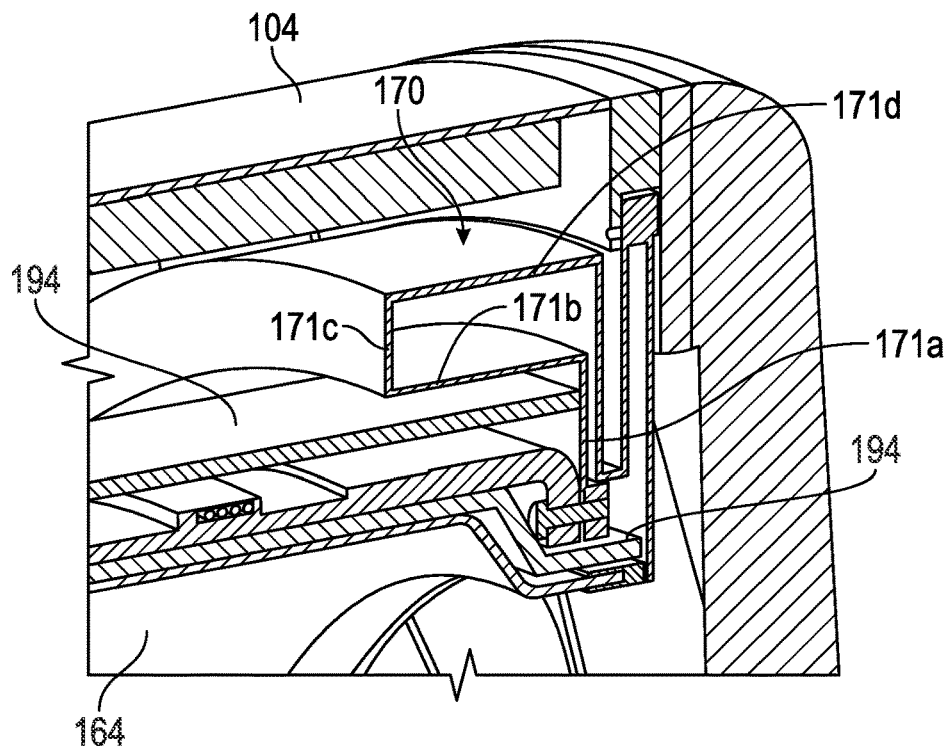
FIG. 18B is a detail view of a re-entrant non-drive end of a stator of a superconducting electrical machine in accordance with one embodiment.

Referring to FIG. 18B, a re-entrant non-drive end 170 of a stator 160 is shown. In some embodiments, heat encounters thermal resistance due to the re-entrant non-drive end 170 as the heat moves towards an interior of the stator 160 (e.g., as the heat moves towards stator windings 228 as shown in FIG. 14A, etc.). In some embodiments, the re-entrant non-drive end 170 includes at least two stator segments 171. For example, the re-entrant non-drive end 170 may include a first stator segment 171a, a second stator segment 171b, a third stator segment 171c, and a fourth stator segment 171d. The at least two stator segments 171 are continuous. For example, the at least two stator segments 171 may be continuous by having been formed in a single piece; the at least three stator segments may be continuous by being directly connected; etc. Referring now to FIG. 14A, an interior of a stator (e.g., stator 160 shown in FIG. 7) may include any portion of the stator 160 inward from the drive end 112 or the non-drive end 116; any portion of the stator 160 disposed at a radius less than an outer radius of the stator 160 (e.g., a radius of the stator frame 104); stator windings 228; a stator composite 232; a stator torque tube 204; etc.

Referring further to FIGS. 18A-18B, in some embodiments, a first stator segment is substantially perpendicular to a plane parallel to the longitudinal axis 10, a second stator segment is coannular with the longitudinal axis 10, a third stator segment is substantially perpendicular to a plane parallel to the longitudinal axis 10, and a fourth stator segment is coannular with the longitudinal axis 10 (see, e.g., stator segments 169a-169d shown in FIG. 18A; stator segments 171a-171d shown in FIG. 18B; etc.). A second stator radius of the second stator segment is less than a fourth stator radius of the fourth stator segment. The stator radii may be measured in a plane perpendicular to the longitudinal axis 10, based on a radial distance from a point where the plane perpendicular to the longitudinal axis 10 is intersected by the longitudinal axis 10. In some embodiments, the at least two stator segments increase a resistance to heat transfer from an outer region of the stator 160, such as a drive end 112 region or a non-drive end 116 region, to an interior of the stator 160. In some embodiments, the resistance to heat transfer is increased by increasing a resistance to conduction, due to an increased length of a pathway for thermal conduction, such as a pathway for thermal conduction including the at least two stator segments.

In some embodiments, a gap is disposed between various components of a stator 160. For example, as shown in FIG. 18A, a gap may be disposed between a stator torque tube 204 and a second stator segment 169b, between a second stator segment 169b and a fourth stator segment 169d, etc. In some embodiments, the gap is at least partially filled with an insulator 194. The insulator may be disposed along a surface of a re-entrant end (e.g., a surface of any of the stator segments 169, etc.) or the stator torque tube 204. Although the figures illustrate the insulator 194 in specific locations, the insulator 194 may preferentially be disposed along a variety of surfaces, such as surfaces of a stator active section (see, e.g., stator active section 162 shown in FIG. 14A), in order to minimize heat transfer to the stator active section 162 from other surfaces with greater temperatures. The insulator 194 may preferentially be disposed along surfaces within the stator 160 that are in thermal communication with other surfaces having greater temperatures. The insulator 194 may be disposed along surfaces that would otherwise have line of sight to surfaces at room temperature, in order to mitigate radiative heat transfer. The insulator 194 may be multi-layer insulation. The insulator 194 may improve the ability of the superconducting electrical machine 100 to maintain a desired temperature by reducing or eliminating heat transfer by radiation between surfaces of the stator segments. In some embodiments, the vacuum environment provided by a cryostat, such as a stator cryostat 164, supplements the performance of the multi-layer insulation. In some embodiments, the insulator 194 mitigates or prevents heat transfer by thermal convection or thermal radiation between surfaces of the stator segments. In some embodiments, the multi-layer insulation has an effective thermal conductivity of approximately 0.1 [milliWatt/meter-Kelvin]. In some embodiments, multi-layer insulation disposed on a surface cooperates with an adjacent vacuum to significantly reduce heat transfer from the surface to another surface.

In some embodiments, a rotor 150 or a stator 160 includes re-entrant ends at both a drive end 112 region and a non-drive end region 116 (see, e.g., rotor 150 shown in FIGS. 17A-17B; stator 160 shown in FIGS. 18A-18B). The rotor 150 may include a first set of rotor segments disposed at or proximate to the drive end 112 region, and a second set of rotor segments disposed at or proximate to the non-drive end 116 region. The stator 160 may include a first set of stator segments disposed at or proximate to the drive end 112 region, and a second set of stator segments disposed at or proximate to the non-drive end 116 region.

In some embodiments, a re-entrant end of a rotor 150 or a stator 160 of a superconducting electrical machine includes at least one of a composite, a metal, and a metal alloy. For example, the sidewall may include titanium, steel, copper, a composite including epoxy and a filler; a composite including E-glass; etc.

In some embodiments, a superconducting electrical machine 100 includes a shaft configured to rotate a rotor 150 (e.g., shaft 152 shown in FIG. 10A, etc.). The rotor 150 includes rotor windings 216 (e.g., superconducting windings of magnesium diboride, etc.). The rotor windings 208 are configured to superconduct when at a temperature no greater than a superconducting temperature. In some embodiments, portions of the shaft 152 may be at a temperature greater than a superconducting temperature. For example, portions of the shaft 152 may be exposed to or otherwise in close contact with an environment surrounding the superconducting electrical machine 100, such as an environment at a room temperature. In some embodiments, a driving force for heat transfer exists due to portions of the shaft 152 being at a temperature greater than a superconducting temperature, and portions of the rotor 150, such as rotor windings 216, being at a temperature no greater than a superconducting temperature. In some embodiments, heat in the shaft encounters thermal resistance provided by at least three rotor segments as the heat travels from the shaft 152 to the rotor winding 216. For example, the at least three rotor segments may extend the length of a pathway between the shaft 152 and the rotor windings 216 along which heat transfer (e.g., thermal conduction) must take place, thus increasing a resistance to heat transfer and in turn decreasing a rate of heat transfer. In some embodiments, the use of re-entrant ends greatly increases the cooling efficiency and/or reduces the cost of operating a superconducting electrical machine 100. The re-entrant ends reduce the energy required to operate a cryocooling system in order to maintain a temperature of a coolant at or below a superconducting temperature.

In some embodiments, a superconducting electrical machine 100 includes a re-entrant end including at least two rotor segments, and a laminated flexor disposed adjacent to the at least two rotor segments (e.g., re-entrant drive end 172, rotor segments 173a-173d shown in FIG. 17A). The laminated flexor provides flexibility to compensate for a change in volume of a rotor 150. For example, a rotor 150 may decrease in volume due to a change in temperature from a first temperature to a second, lower temperature. In some embodiments, the first temperature is a room temperature (e.g. 293 Kelvin, 298 Kelvin, etc.), and the second temperature is a superconducting temperature. Due to thermal contraction resulting from the change in temperature, portions of the superconducting electrical machine 100 may decrease in volume, applying a stress to the superconducting electrical machine 100. For example, the superconducting electrical machine 100 may contract in a dimension parallel to the longitudinal axis, causing an axial stress. The laminated flexor compensates for the change in volume in order to mitigate buildup of stress.

As shown in the figures and described in the written description, a superconducting electrical machine 100 may be fully superconducting: both a rotor 150 and a stator 160 are capable of operating in a superconducting fashion, as rotor windings 216 and stator windings 228 are each able to superconduct when maintained at a temperature no greater than a superconducting temperature. In other embodiments, a superconducting electrical machine may be partially superconducting. For example, just a rotor, or just a stator, may be configured to superconduct. In some embodiments, only one of a rotor or a stator may be provided with a composite such as rotor composite 208 or stator composite 232. In some embodiments, only one of a rotor 150 or a stator 160 may be provided with cooling tubes, such as rotor cooling tubes 220 or stator cooling tubes 224, in order to maintain respective superconductors at or below a superconducting temperature.

Generally, the term volume change may encompass any change in a volume of a superconducting electrical machine or a component of a superconducting electrical machine (e.g. a rotor, a stator, superconducting windings, etc.). A volume change may refer to any change in dimensions of a superconducting electrical machine or a component of a superconducting electrical machine, such as an expansion or a contraction. A volume change may be a thermal volume change induced by a change in temperature of a material. An expansion or a contraction may occur in one dimension, two dimensions, or three dimensions. An expansion or contraction may occur in some dimensions at some temperatures, and in other dimensions at other temperatures. An expansion or contraction may be measured by various techniques, such as by comparing a change in a dimension of a material (e.g. length, etc.), to an initial dimension of the material. A material property such as a thermal expansion coefficient may be used regarding volume changes for a material. The thermal expansion coefficient may correspond to various volume changes, including a contraction that occurs when the temperature of a material decreases and an expansion that occurs when the temperature of a material increases.

In some embodiments, a system for reducing a rate of heat transfer in a superconducting electrical machine 100 includes a continuous pathway for heat transfer from a heat source to a heat sink, and a sidewall disposed along the pathway. The sidewall includes a plurality of sidewall segments. Each of the sidewall segments is continuous with at least one adjacent sidewall segment. The plurality of sidewall segments increases a resistance to heat transfer from the heat source to the heat sink.

A pathway may be continuous if there is solid material provided throughout the pathway. A continuous pathway for heat transfer may be a pathway along which thermal conduction may occur uninterrupted (e.g., without having to change to a thermal convection mode of heat transfer or a thermal radiation mode of heat transfer) throughout the pathway. A sidewall segment may be continuous with an adjacent sidewall segment if the sidewall segments are formed in one piece; if the sidewall segments are directly connected; etc.

In some embodiments, the system includes an insulator disposed adjacent to at least a portion of the sidewall. For example, an insulator may be provided along a surface of a sidewall segment. The insulator may be multi-layer insulation. In some embodiments, the insulator mitigates or prevents heat transfer by thermal radiation or thermal convection between surfaces of the plurality of sidewall segments. In some embodiments, multi-layer insulation disposed on a surface cooperates with an adjacent vacuum to significantly reduce heat transfer between the surface and another surface. In some embodiments, the insulator has an effective thermal conductivity of 0.1 [milliWatt/meter-Kelvin].

A heat source may be any of a variety of sources of heat, such as an environment remote from the system, or components of a superconducting electrical machine 100, including but not limited to a shaft of a rotor 150, a stator frame 104 supporting a stator 160, etc. The heat source may have a temperature greater than a superconducting temperature. In some embodiments, the heat source includes a shaft of a rotor 150, and a temperature of the shaft is greater than a superconducting temperature. This leads to a driving force for heat transfer from the shaft to portions of the superconducting electrical machine 100 having a temperature no greater than a superconducting temperature, such as rotor windings 216.

A heat sink may be any location, component, or other feature having a relatively low temperature. For example, a heat sink may be a superconductor having a temperature no greater than a superconducting temperature, such as rotor windings 216 or stator windings 228. A heat sink may be a composite layer at least partially surrounding the windings, such as a rotor composite 208 or a stator composite 232. A heat sink may be a cooling tube, or coolant contained by the cooling tube. In some embodiments, the plurality of sidewall segments increases a resistance to heat transfer between a heat source and rotor windings 216 or stator windings 228, in order to improve the ability of the system to maintain the active sections 154, 162 of the superconducting electrical machine 100 at a temperature no greater than a superconducting temperature. In some embodiments, the plurality of sidewall segments increases a resistance to heat transfer between a heat source and the coolant, in order to improve the cooling performance of the coolant by minimizing any heat loads drawn by the coolant from sources other than the windings.

In some embodiments, the sidewall comprises at least one of a composite, a metal, and a metal alloy. For example, the sidewall may include titanium, steel, copper, a composite including epoxy; a composite including E-glass; etc.

The construction and arrangement of the systems and methods as shown in the various exemplary embodiments are illustrative only. Although only a few embodiments have been described in detail in this disclosure, many modifications are possible (e.g., variations in size, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A superconducting electrical machine, comprising:
a rotor configured to rotate about a longitudinal axis, the rotor comprising:
a rotor winding configured to superconduct when a temperature of the rotor winding is no greater than a superconducting temperature;
a drive end;
a non-drive end; and
two re-entrant ends, of which a first re-entrant end is disposed proximate to the drive end, and a second re-entrant end is disposed proximate to the non-drive end, each of the two re-entrant ends comprising:
at least two rotor segments, wherein the rotor segments are continuous, a first rotor segment is substantially perpendicular to a plane parallel to the longitudinal axis, and a second rotor segment is coannular with the longitudinal axis, wherein each re-entrant end further comprises a third rotor segment and a fourth rotor segment, wherein the third rotor segment is substantially perpendicular to a plane parallel to the longitudinal axis, the fourth rotor segment is coannular with the longitudinal axis, and a second rotor radius of the second rotor segment is greater than a fourth rotor radius of the fourth rotor segment;
wherein heat distal from the rotor winding encounters thermal resistance provided by the at least one re-entrant end as the heat travels towards the rotor winding.

2. The superconducting electrical machine of claim 1, further comprising a rotor composite surrounding the rotor winding.

3. The superconducting electrical machine of claim 2, wherein each re-entrant end is continuous with a rotor torque tube, and the rotor composite is disposed along a surface of the rotor torque tube.

4. The superconducting electrical machine of claim 1, wherein the rotor comprises a shaft disposed substantially coannular with the re-entrant ends; wherein each re-entrant end is attached to the shaft and at least partially surrounds the shaft; and wherein heat in the shaft encounters thermal resistance provided by the re-entrant ends as the heat travels from the shaft to the rotor winding.

5. The superconducting electrical machine of claim 1, further comprising at least one insulator disposed along a surface of at least one of the one re-entrant ends.

6. The superconducting electrical machine of claim 1, wherein the winding comprises magnesium diboride.

7. The superconducting electrical machine of claim 1, further comprising a laminated flexor disposed adjacent to the at least two rotor segments of a re-entrant end, wherein the laminated flexor provides flexibility to compensate for a change in volume of the rotor.

8. A superconducting electrical machine, comprising:
a stator disposed substantially coannular with a longitudinal axis, the stator comprising:
a stator winding configured to superconduct when a temperature of the stator winding is no greater than a superconducting temperature;
a drive end;
a non-drive end; and
two re-entrant ends, of which a first re-entrant end is disposed proximate to the drive end, and a second re-entrant end is disposed proximate to the non-drive end, each re-entrant end comprising:
at least two stator segments, wherein the stator segments are continuous, a first stator segment is substantially perpendicular to a plane parallel to the longitudinal axis, and a second stator segment is coannular with the longitudinal axis, wherein the at least one re-entrant end further comprises a third stator segment and a fourth stator segment, wherein the third stator segment is substantially perpendicular to a plane parallel to the longitudinal axis, the fourth stator segment is coannular with the longitudinal axis, and a second stator radius of the second stator segment is less than a fourth stator radius of the fourth stator segment;
wherein heat distal from the stator winding encounters thermal resistance provided by the at least one re-entrant end as the heat travels towards the stator winding.

9. The superconducting electrical machine of claim 8, further comprising a stator composite surrounding the stator winding.

10. The superconducting electrical machine of claim 9, wherein each re-entrant end is continuous with a stator torque tube, and the stator composite is disposed along a surface of the stator torque tube.

11. The superconducting electrical machine of claim 8, further comprising a stator frame supporting the stator; and wherein heat in the stator frame encounters thermal resistance provided by the at least two stator segments as the heat travels from the stator frame to the stator winding.

12. The superconducting electrical machine of claim 8, further comprising at least one insulator disposed along a surface of the at least one re-entrant end.

13. The superconducting electrical machine of claim 8, wherein the winding comprises magnesium diboride.

* * * * *